(12) United States Patent
Wang et al.

(10) Patent No.: US 11,860,905 B2
(45) Date of Patent: Jan. 2, 2024

(54) SCANNING FOR INFORMATION ACCORDING TO SCAN OBJECTIVES

(71) Applicant: PayPal, Inc., San Jose, CA (US)

(72) Inventors: Gaoyuan Wang, San Jose, CA (US); Jie Huang, Shanghai (CN); Zelin Yan, Shanghai (CN); Fuyuan Kang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/334,356

(22) Filed: May 28, 2021

(65) Prior Publication Data
US 2021/0374163 A1    Dec. 2, 2021

(30) Foreign Application Priority Data

Jun. 1, 2020 (WO) ................ PCT/CN2020/093717

(51) Int. Cl.
*G06F 16/28* (2019.01)
*G06F 16/25* (2019.01)
(Continued)

(52) U.S. Cl.
CPC ........ *G06F 16/285* (2019.01); *G06F 11/3442* (2013.01); *G06F 16/215* (2019.01); *G06F 16/252* (2019.01); *G06F 16/258* (2019.01)

(58) Field of Classification Search
CPC .... G06F 16/285; G06F 16/215; G06F 16/258; G06F 16/252; G06F 11/3442
See application file for complete search history.

(56) References Cited

U.S. PATENT DOCUMENTS

| 5,438,433 A | * | 8/1995 | Reifman | ............ | H04N 1/00411 |
| | | | | | 358/468 |
| 7,266,041 B1 | * | 9/2007 | Padgett | ................. | G01V 1/288 |
| | | | | | 702/14 |

(Continued)

FOREIGN PATENT DOCUMENTS

| CN | 110674505 A | 1/2020 |
| WO | 2020041624 A1 | 2/2020 |

OTHER PUBLICATIONS

International Search Report and Written Opinion in PCT Appl. No. PCT/CN2020/093717 dated Feb. 25, 2021, 9 pages.

(Continued)

*Primary Examiner* — Mark D Featherstone
*Assistant Examiner* — Brooks T Hale
(74) *Attorney, Agent, or Firm* — Kowert, Hood, Munyon, Rankin & Goetzel, P.C.; Dean M. Munyon

(57) ABSTRACT

Techniques are discussed for preparing and executing scanning plans for particular types of information, including personally identifiable information. A user indicates one or more datastores to be scanned for the particular type of information. A scanner determines scan objectives for the scanning plan and classifiers for use in scans conducted according to the scanning plan. The scanner estimates scan performance metrics and scan quality metrics. The scanner presents estimated results for the scanning plan based on the selected classifiers, scan objectives, estimate scan performance metrics, and estimated scan quality metrics. The user can modify the set of scan objectives or select between alternative sets of scan objectives. The scanning plan may be performed iteratively and the results of previous scan may be used to adjust classifiers or scan objectives to be used in subsequent scans.

20 Claims, 16 Drawing Sheets

(51) Int. Cl.
   *G06F 11/34*      (2006.01)
   *G06F 16/215*     (2019.01)

(56) References Cited

U.S. PATENT DOCUMENTS

| | | | |
|---|---|---|---|
| 9,645,983 B1* | 5/2017 | Tuan | G06F 16/957 |
| 10,102,533 B2 | 10/2018 | Barday | |
| 10,430,740 B2 | 10/2019 | Barday et al. | |
| 10,438,020 B2 | 10/2019 | Barday et al. | |
| 2002/0104014 A1* | 8/2002 | Zobel | G06F 21/577 |
| | | | 726/26 |
| 2005/0210262 A1* | 9/2005 | Rolia | H04L 67/30 |
| | | | 726/1 |
| 2006/0017959 A1* | 1/2006 | Downer | G07D 7/004 |
| | | | 358/1.14 |
| 2007/0266079 A1* | 11/2007 | Criddle | G06Q 10/107 |
| | | | 709/203 |
| 2011/0302650 A1* | 12/2011 | Brown | G06F 21/562 |
| | | | 711/E12.091 |
| 2012/0060030 A1* | 3/2012 | Lamb | H04L 63/0876 |
| | | | 726/2 |
| 2017/0132495 A1 | 5/2017 | Feris et al. | |
| 2018/0129822 A1* | 5/2018 | Martinez | G06F 21/6245 |
| 2018/0247321 A1* | 8/2018 | Crabtree | G06Q 30/0242 |
| 2018/0307859 A1 | 10/2018 | LaFever et al. | |
| 2018/0358001 A1* | 12/2018 | Amid | G06F 16/3329 |
| 2019/0034808 A1* | 1/2019 | Palanichamy | G06Q 30/0201 |
| 2019/0222602 A1* | 7/2019 | Linder | H04L 63/1433 |
| 2019/0340388 A1 | 11/2019 | Eidson et al. | |
| 2019/0347429 A1* | 11/2019 | Jean-Louis | G06N 20/00 |
| 2020/0020000 A1 | 1/2020 | Guy et al. | |
| 2020/0026877 A1 | 1/2020 | Dattatri et al. | |

OTHER PUBLICATIONS

Anonymous, PII Scanning and Detection; https://docs.storagemadeeasy.com/piidiscovery; Nov. 21, 2018 (Nov. 21, 2018).

* cited by examiner

Objective Scanning Template: Small_Business8-template — 1010

1040 — Cancel / Estimate / Save As Temp / Next
1042 — Sampling Confidence Level
- FastTouch ○ 50% (1160/Table)
- AutoMode ● 99% (16700/Table)
- FullScale ○ 100% (Full Table)
- Customize --choose-- ▼ %
- Sampling Size For Each Table: --

1044 — Scan Priority
- ○ Low ○ Middle ● High — 1046

Account Privacy Profile
- ● No ○ Yes — 1048

Data Category
- ☑ Structured
- ☑ Unstructured
- ☑ Image

Region Detection
- ○ No ● Yes
- Choose Region
- EU ×

1050

Radar chart axes: Coverage (Detection), Accuracy (F1), Duration, Confidence (Detection), Confidence (Sampling)
○ Small_Business 8   ○ Estimation

| Strategy | Classification | |
|---|---|---|
| Name | Description | Details |
| Initial-scan-disabled-for-empty-table | Do NOT scan empty tables ~1062 | View |
| Initial-scan-enabled-with-fullscan | Full scan for tables which the table size smaller than sampling size ~1064 | View |
| Set-sampling-method-for-rdb-small-table | Use given sampling method for sampling and ingestion for small tables in RDB like MySQL, Postgress | View |
| Set-sampling-method-for-rdb-midsize-table | Use given sampling method for sampling and ingestion for midsize tables in RDB like MySQL, Postgress | View |
| Set-sampling-method-for-Teradata-Large-table | Use given sampling method for sampling and ingestion for large tables in Teradata | View |
| Set-sampling-method-for-Teradata-Huge-table | Use given sampling method for sampling and ingestion for huge tables in Teradata | View |
| New-iteration-refined | Refine new iterations based on source schema changes, source row count changes, wether linking fields existence, regionRatio etc by enable/disable new iteration or specific operations ~1068 | View |

SCANNING FOR INFORMATION ACCORDING TO SCAN OBJECTIVES

PRIORITY CLAIM

The present application claims priority to PCT Appl. No. PCT/CN2020/093717, filed Jun. 1, 2020, which is incorporated by reference herein in its entirety.

BACKGROUND

Technical Field

This disclosure relates generally to scanning computer systems for information including personally identifiable information (PII).

Description of the Related Art

Various organizations and governmental entities are increasingly concerned about the retention, protection, transfer, and usage of sensitive information, including PII. For example, the European Union's General Data Protection Regulation (GDPR) concerns data protection, privacy, and transfer of personal data in the European Union (EU) and the European Economic Area (EEA). Under the GDPR, controllers and processors of personal data must put in place appropriate technical and organizational measures to implement the data protection principles. Other governmental regulations similar to the GDPR are being promulgated in various other jurisdictions, and non-governmental organizations have developed regulations and guidance concerning sensitive information, including PII. In order for a company, organization, person, or other entity to comply with such regulations, however, that entity first must identify what sensitive information that entity possess and where it is stored.

BRIEF DESCRIPTION OF THE DRAWINGS

FIGS. 9, 10A, 10B, 11, and 12 are screenshots of an information scanner user interface in accordance with various embodiments.

Figure 1:
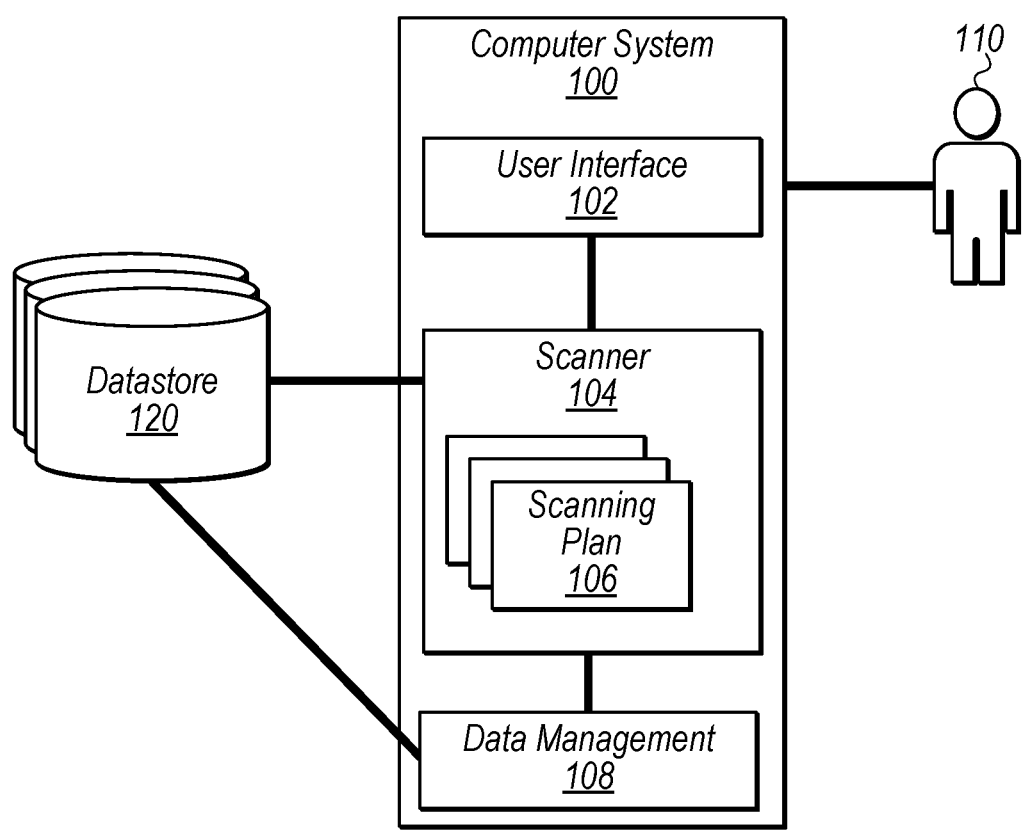
FIG. 1 is a block diagram illustrating an embodiment of a computer system configured to scan for sensitive information.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to scan" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" sets of scan objectives would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, automated decision making). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

Identifying a particular type of information stored in a numerous datastores such as sensitive information can be a complex problem that frequently has many strategic concerns that must be balanced, most notably scan quality versus scan duration and resource usage. Moreover, complying with data governance requirements relating to PII adds an additional level of complexity. An intensive, high quality scan having high scan coverage and a high statistical confidence level may identify all sensitive information in a datastore, but it may take too long to perform on available computer resources to be practical. Conversely, a shorter scan may result in a statistical confidence level that is too low to adequately ensure compliance with regulations or benchmarks. Moreover, data records stored in datastores to be scanned may be widely varied with many different kinds of data stored in many different ways. Further, the amount of data that is stored may far exceed processing power necessary to scan all of the data in a reasonable amount of time, so different sampling techniques may useful to more efficiently utilize existing resources to perform a reasonably high-quality scan in a reasonable amount of time. Finally, because in many instances new data records are added to datastores constantly, it is important to repeat scans to continue compliance. The techniques disclosed herein enable a user to balance scan quality with scan duration in view of the resources that are available to perform a scan, to tailor the scan to the type of data records being scanned, to manage repeated scans that utilize the results of previous scans to improve subsequent scans, and to generate reports and metrics that are indicative of scan coverage, classification quality, and statistical confidence level of the scan as well as performance metrics of the scanning process. Accordingly, the disclosed techniques enable users to scan datastores for date of interested (e.g., PII) to perform various actions to be taken on this data (e.g., to implement a "right to be forgotten" as required by relevant regulations).

FIG. 1 is a block diagram illustrating an embodiment of a computer system 100 configured to scan for sensitive information. Computer system 100 is one or more computer systems operable to implement user interface 102 and scanner 104. In various embodiments, computer system 100 also implements a data management module 108. In various embodiments, computer system 100 is implemented by software running on a computer system (e.g., a desktop computer, a laptop computer, a tablet computer, a mobile phone, a server) or a plurality of computer systems (e.g., a network of servers operating as a cloud). In other embodiments, computer system 100 is implemented in specialized hardware (e.g., on an FPGA) or in a combination of hardware and software. In various embodiments, security computer system 100 is operable to perform other functions in addition to implementing user interface and scanner 104.

User interface 102 is operable to present information to user 110 and receive information from user 110. In various embodiments, user interface 102 includes one or more input/output devices including but not limited to one or more visual displays (e.g., a monitor, a touchscreen), one or more speakers, one or more microphones, a haptic interface, a pointing device (e.g., mouse, trackball, trackpad, etc.), a keyboard, or any combination.

Scanner 104 is a platform that enables the preparation and implementation of one or more scanning plans 106 to identify information stored in datastores 120. As discussed herein, scanner 104 is operable to identify any particular type of information in various embodiments including but not limited to sensitive information such as personally identifiable information (PII). As used herein, "personally identifiable information" is any data that could potentially be used to identify a particular person. Examples include but are not limited to a full name, a Social Security number, a driver's license number, a bank account number, a passport number, and an email address. As discussed herein, scanner 104 is operable to receive indications of one or more datastores 120 to be scanned for a particular type of information during a scan, to determine one or more classifiers to apply to the one or more datastores during the scan to identify the particular type of information, and to determine a plurality of scan objectives for the scan. In various embodiments, scan objectives include but are not limited to a target confidence level for the scan, one or more sampling strategies for the scan, indications of portions of a PII scan logic library to be used in the scan (e.g., indications of scan logic corresponding to one or more particular PII regulations, indications of one or more data categories of data to be scanned), etc. Further, scanner 104 is operable to determine available computer resources (e.g., processing power, memory, etc. of computer system 100) to perform the scan and estimate scan quality metrics and estimated execution duration for the scan based on the scan objectives and the available computer resources. Using user interface 102, scanner 104 is also operable to present user 110 with indications of the estimated scan quality metrics and estimated execution duration for the scan and receive one or more commands from user 110. Scanner 104 is also operable to perform the scan in response to one or more commands from user 110. In various embodiments, scanner 104 is operable to receive modifications to the scanning plan 106 from user 110, update the estimated scan quality metrics and/or estimated execution duration, and present the updated estimates to user 110. In some embodiments, estimated scan quality metrics and/or estimated execution duration corresponding to multiple different scanning plan 106s are generated and presented to user 110, user 110 selects or modifies one of these scanning plan 106s, and the selected scanning plan 106 is used to conduct a scan of datastores 120. In various embodiments, user 110 is presented with a schedule indicative of repeated iterations of a particular scanning plan 106. Scanner 104 is also operable to track various metrics related to the performance of various scanning plans 106 that are useable to generate reports to prove compliance with various PII regulations, data security audits, or other requirements in various embodiments.

As discussed herein, scanner 104 is operable to generate one or more scanning plans 106. The individual scanning plans 106 indicate what and where to scan (e.g., which datastores 120, which folders or tables within datastore 120, etc.), when to scan (e.g., one holistic scan, two or more repeated scans, scanning when a datastore 120 reaches a threshold amount of unscanned data records), why to scan (e.g., which regulations are applicable), and/or how to scan (e.g., a target confidence level, sampling strategies to employ, what metrics to record). As discussed herein, in various embodiments, various scanning plans 106 are performed iteratively with subsequent scans using the results of previous scans to adjust the subsequent scan. As discussed herein, subsequent scans using a particular scanning plan 106 may be performed using different classifiers and/or scan objectives than a previous scan using the same particular scanning plan 106. For clarity, as used herein, the term "proposed scanning plan" refers to a scanning plan 106 that has been specified but has not been executed and may be subject to input by user 110 in which scanning objectives are changed. Scanner 104 and its various components are discussed herein in reference to FIGS. 2-7 and 15, various methods of using scanner 104 to create and perform scanning plan 106s are discussed herein in reference to FIGS. 8, 13, and 14, and example screens from user interface 102 presented in connection with the disclosed techniques are discussed herein in reference to FIGS. 9-12.

In various embodiments, computer system 100 includes a data management module 108. Data management module 108 is operable to prepare reports for user 110 that are indicative of sensitive information identified during one or more scans and/or to manage data records containing sensitive information (including deletion of such data records). In various embodiments, for example, data management module 108 is operable to provide to user 110 a report indicative of PII corresponding to user 110 that is stored in datastores 120 (e.g., as required in various PII regulations such at the GDPR). In various embodiments, data management module is operable to delete some or all PII corresponding to a user 110 from one or more datastores 120 in response to receiving a deletion request (e.g., as required by a "right to be forgotten" clause in a PII regulation). In various embodiments, a deletion report is generated for user 110 once the PII has been deleted as requested.

User 110 is an individual who seeks to configure a scanning plan 106 using scanner 104, and in various instances, run a scan according to the scanning plan 106, or to access information (or reports) generated by scanner 104 or data management module 108. User 150 may be a natural person, a group of natural persons, an organization in various embodiments. In various instances, user 150 controls, maintains, and/or services one or more datastores 120. In various instances, user 150 is a chief privacy officer, reports to a chief privacy officer, or is otherwise is tasked with ensuring compliance with one or more PII regulations such as the EU's GDPR, the California Consumer Privacy Act (CCPA), etc.

One or more datastores 120 are any of a number of electronic datastores implemented on any of a number of electronic storage media useable to store information. In various embodiments, datastores 120 may be stored on any suitable memory device or system in various embodiments including a single memory (e.g., a hard drive, solid-state drive, etc.), an array of memories, or a storage computer system. In some embodiments, the one or more datastores 120 include one or more restricted datastores that are configured to permit only local access to the information stored thereon. For example, such restricted datastores 120 permit access via a shared I/O bus or via requests from computer systems on the same LAN, but not over a WAN. In some of such embodiments, restricted datastores are installed within computer system 100 and only accesses by computer system 100 are permitted. In either embodiment, scanner 104 is operable to prepare a scanning plan to scan such restricted datastores 120 and to execute the scanning plan on the restricted datastores 120. In other embodiments, datastores 120 may be a storage service remote from computer system 100.

The various datastores 120 may store any type of information including structured data, unstructured data, and media data (e.g., image, audio, video). In various embodiments, datastores 120 store massive amounts of data (e.g., hundreds or thousands of terabytes) and new data records may be added to datastores 120 at high velocity (e.g., thousands or millions or more data records added per day). For example, datastores 120 might include any of a wide array of different types of records including but not limited to records of chat logs from customer service interactions, names and addresses, sales records, social media comments, images uploaded in customer reviews, etc. Some datastores 120 may be maintained by user 110 (e.g., a structured database of names and address) but others may simply store information as it is input by customers, service representatives, or others. In some embodiments, some data records are persistent and stay in datastore 120 for a relatively long period of time (e.g., months or years) whereas other data records are temporary (e.g., deleted after 30 or 60 days).

According to the techniques discussed herein, computer system 100 is operable to provide user 110 with a comprehensive user experience to prepare, compare, modify, and perform scanning plans 106 to identify a particular type of information stored in datastores 120. As discussed herein, in various embodiments various scanning plans 106 are useable to identify PII in order to comply with various PII regulations and to maintain compliance by repeating scans according to a schedule. Additionally, computer system 100 enables a user 110 to receive reports about sensitive information corresponding to them that is stored on datastore 120 and, in various instances, to request the deletion of such information using data management module 108. The metrics generated by scanner 104 may be used to demonstrate compliance with various regulations, and identified information may be provided to third-parties (e.g., government inspectors, individuals requesting a record of their stored PII, etc.). Because all of these capabilities are incorporated into scanner 104, user 110 is able to perform various data security tasks using a single user interface. Moreover, because scanner 104 is implemented as a platform, additional capabilities to comply with additional regulations (e.g., additional PII regulations) or requirements may be added. Further, because scanner 104 may be implemented on as an installed application or script running in a data center storing sensitive information, such sensitive information need not be exposed to the Internet or an unsecure WAN in various embodiments.

Scanner 104 also provides flexibility that enables various different users 110 with different requirements to generate and execute scanning plans 106 that meet such requirements. In various instances, for example, PII regulations in different jurisdictions may differ greatly in scope. Scanner 104 provides a flexible platform that can provide various target information classifiers (e.g., classifiers 206 discussed herein) that are operable to satisfy different obligations under different PII regulations, and under different risk appetites of different users 110. Further, scanner 104 is operable to prepare a scanning plan 106 that balances the hardware capabilities of computer system 100 with the level of scan quality indicated by user 110 such that the highest quality scan can be performed in an acceptable amount of time and resource usage. Accordingly, a user 110 who prepares scanning plan 106 does not necessarily have to have technical training or configure computer system 100 and instead can focus on requirements like what scan quality is acceptable and what datastores 120 to scan rather than how the scan will be performed.

Figure 2:
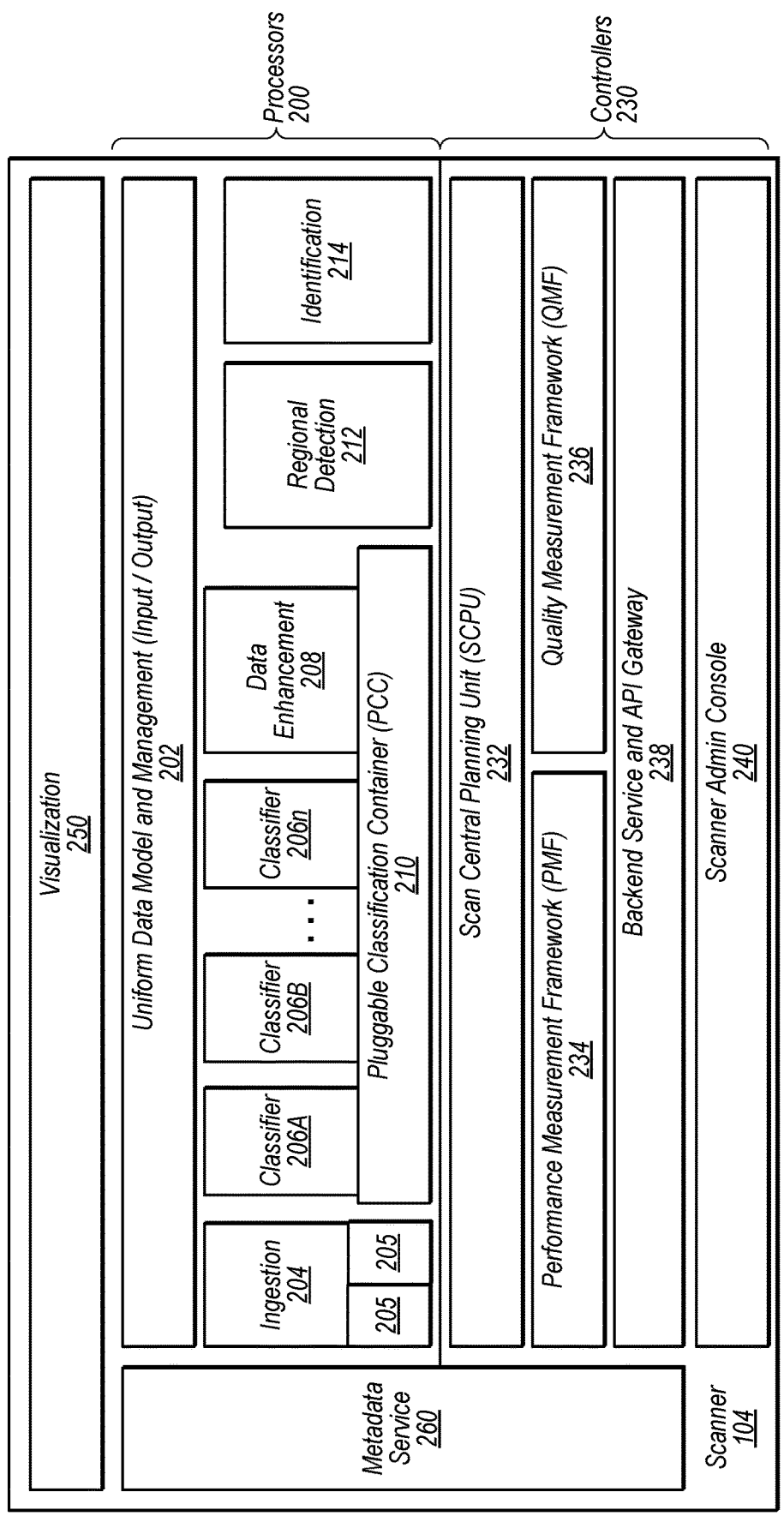
FIG. 2 is an expanded block diagram of the scanner of FIG. 1 in accordance with various embodiments.

FIG. 2 is an expanded block diagram of scanner 104 in accordance with various embodiments. In various embodiments, scanner 104 includes a plurality of processor modules 200, a plurality of controller modules 230, a visualization module 250, and a metadata service module 260. As defined herein, scanner 104 is a platform implemented by computer system 100, and the various components illustrated in FIG. 2 are implemented as modules. While the various modules shown in FIG. 2 are represented as discrete modules, it will be understood that the various operations performed by various modules may be subdivided into additional modules or combined with other modules in various configurations.

In various embodiments, processor modules 200 include a uniform data model and management module 202, a data ingestion module 204 having one or more connectors 205, a pluggable classification container (PCC) 210 operable to receive one or more classifier modules 206 (e.g., classifier A 206A, classifier B 206B, classifier n 206n), a data enhancement module 208, a regional detection module 212, and an identification module 214.

In various embodiments, uniform data model and management module 202 is operable to provide a unified access interface for scanning results generated as by the various scanning plans 106. As discussed herein, the scanning results are retained in storage (e.g., stored in a datastore 120), and in various embodiments uniform data model and management module 202 is an API that is operable to read these scanning results and present a summary to user 110. Data ingestion module 204 is operable to perform pre-processing on data records stored in datastores 120 to facilitate scanning by scanner 104. In various embodiments, data ingestion module 204 include a plurality of connectors 205 that are useable by data ingestion module 204 to facilitate ingestion of information from particular datastores 120 (e.g., a first connector 205 useable to facilitate ingestion of data records in a first datastore 120, a second connector 205 useable to facilitate ingestion of data records in a second datastore 120, etc.).

PCC 210 is a standardized interface into which a plurality of classifiers 206 can be plugged. As discussed further in connection to FIG. 5, PCC 210 provides a standardized interface that defines the kinds of calls or requests that can be made by classifiers 206, how to make calls and requests, the data formats that should be used, the conventions to follow, etc. Accordingly, PCC 210 provides an extension capability in the ability of scanner 104 to classify data records that user 110 can use to add additional classifiers 206 as desired.

The various classifiers 206 are different classification algorithms that can be applied to data records in datastores 120 being scanned to detect a particular type of information (e.g., PII or other sensitive information). As shown in FIG. 2, any number of classifiers 206 may be present including classifier A 206A, classifier B 206, a classifier n 206n. Such classifiers 206 may use various classification strategies to detect a particular type of information including but not limited to linear classification (e.g., logistic regression algorithms, naïve Bayes algorithms), quadratic classification, stochastic gradient descent algorithms, kernel estimation (e.g., k-nearest neighbor algorithms), decision tree algorithms, random forest algorithms, support vector machines algorithms, champion-challenger algorithms, and neural network classification (e.g., Enigma classification). In some embodiments, one or more classifiers 206 uses natural language processing algorithms to determine whether unstructured data contains target information. In various embodiments, some classifiers 206 may be included as part of scanner 104 as a default, but other classifiers 206 may be added by user 110. Such added classifiers 206 may be third-party classifiers 206 (e.g., classifiers 206 that user 110 has licensed for use in scanner 104) or may be built by user 110 (or on behalf of user 110). A user 110 may use knowledge of the datastores 120 he or she manage to prepare a classifier 206 tailored to the datastore 120. For example, if user 110 suspects that a datastore mostly contains records of customer service interactions, a custom classifier 206 built by user 110 for scanning this datastore 120 might favor classifications of names, address, and email addresses over classifications of images of faces or recognition of credit card numbers. The various functions and sub-components of PCC 210 are discussed in further detail in reference to FIGS. 3 and 5.

Regional detection module 212 is operable to attempt to determine a geographic region associated with various records in datastores 120. In various instances, regulations such as PII governance regulations are applicable to information associated with a particular region. For example, the EU's GDPR applies to residents of the EU and information stored in the EU. Thus, in various instances if a record includes PII or other sensitive information and corresponds to particular geographic region, regional detection module 212 is operable to flag that data record as containing information that is subject to regulations for that particular region. In various embodiments, regional detection module 212 includes scan logic for various regions (and regulations that are applicable to such regions) including but not limited to the EU, California, Brazil, Japan, South Korea, Argentina, and Kenya. As discussed herein, in various embodiments, one or more scan objectives may indicate a particular region (and therefore a particular regulation) to scan for in a particular scanning plan 106. Accordingly, scan logic corresponding to these regions would be included in scanning plan 106. Alternatively or additionally, scan objectives may indicate a particular region to exclude from a particular scanning plan 106 (e.g., user 110 knows that no Brazilian data records are in datastores 120). Accordingly, scan logic corresponding these excluded regions would be left out of scanning plan 106. In various embodiments, such inclusions and/or exclusions may be input by user 110 (see FIGS. 10A and 10B).

Identification module 214 is operable to attempt to determine a particular individual (or entity) to whom sensitive information is associated. In instances where the sensitive information is PII, identification module 214 is operable to identity the particular person to whom the PII is associated. In various embodiments, identification module 214 build a dossier for various particular individuals and references such dossiers to associate a particular record with a particular person. For example, a dossier for John Smith might include his name, address, telephone number, email address, and user account name, and identification module 214 is operable to associate data records with John Smith based on matches between such data records and the dossier. Additionally, in various embodiments identification module 214 employs machine learning techniques such as classification algorithms, clustering algorithms, and fuzzy logic to generate approximate matches between sensitive information and a particular individual.

In various embodiments, controller modules 230 include a scan central planning unit module (SCPU) 232, a performance measurement framework module (PMF) 234, a quality measurement framework module (QMF) 236, a backend service and API gateway module 238, and a scanner admin console 240.

SCPU 232 is operable to coordinate the various functions of the various processor modules 200, controller modules 230, and metadata service module 260. In various instances, SCPU 232 is operable to take in inputs from the various processor modules 200, controller modules 230, and metadata service module 260 and attempt to balance between scan quality and performance to determine a scanning plan 106. In various instances, SCPU 232 is operable to propose a scanning plan 106 based on scan objectives input by user 110 such as a maximum scan duration and a target sampling confidence level. For example, user 110 may input scan objectives relating to maximum scan duration, number of times to iterate a scan, sampling strategies, focus regions, particular classifiers 206 to employ (e.g., classifies for phone numbers, emails, Social Security Number), selection of datastores 120 that must be scanned, and various thresholds (e.g., sampling thresholds discussed in connection to FIG. 4). From these scan objectives, SCPU 232 is operable to propose a physical execution plan (e.g., what data records to scan and in what order) for the scanning plan 106. In such embodiments, SCPU 232 is operable to propose one or more scanning plans 106 that meets such scan objectives and present the one or more proposed scanning plans 106 to user 110 for the user 110 to select. In various embodiment, the various proposed scanning plans 106 differ in various ways including but not limited to employing different sampling strategies, using different classifiers 206, using different scan logic (e.g., omitting scan logic for particular geographic regions, omitting identification scan logic on one or more initial iterations of a scan), and employing different scan priorities (e.g., a hierarchy in which processing resources are allocated between concurrently running scanning plans 106). SCPU 232 is also operable to perform a scan of datastore 120 using a particular scanning plan 106 and record the results (e.g., identified data records, metrics for the scanning plan 106, etc.). SCPU 232 is also operable to use the results of prior scans to improve subsequent scans (e.g., by determining to skip a datastore 120 that has not changed since the last iteration). Such improvements may be rule-based (e.g., if X is above a threshold, then skip datastore 120 in a subsequent scan) or may be based on machine learning models. The various functions and sub-components of SCPU 232 are discussed in further detail in reference to FIGS. 3 and 4.

PMF 234 is operable (a) to estimate scan performance metrics based on a particular proposed scanning plan 106 and/or (b) to collect scan performance metrics for an ongoing scan that is being performed according to a scanning plan 106 and to evaluate the scan performance metrics for a completed scanning plan 106 (or a completed iteration of a repeating scanning plan 106). Such scan performance metrics includes but are not limited to metadata collection, scan progress statistics, scan health status (e.g., whether a scan has incurred an error and had to be terminated prematurely), system computer resource usage (e.g., degree of parallelism, number of processors used in a single scan iteration and/or in total, size of memories used in a single scan iteration and/or in total), and scan velocity. PMF 234 is also operable to calculate estimated scan duration for a proposed scanning plan 106 based on scanning objectives for the proposed scanning plan 106. In various embodiments, PMF 234 is operable to send estimated and/or collected scan performance metrics to QMF 236. In various embodiments, PMF 234 is operable to collect scan performance metrics during an ongoing scan and make such scan performance metrics available to visualization module 250 directly (or via SCPU 232) such that visualization module 250 is operable to generate a visualization of the progress of an ongoing scan (e.g., a visualization showing scan velocity of an ongoing scan system computer resource usage, and an estimated remaining scan duration). Similarly, PMF 234 is operable to make scan performance data (or evaluations thereof) of a completed scan (or a completed iteration of a scan) available to visualization module 250 directly, or via SCPU 232 such that visualization module 250 is operable to generate a visualization of the performance of the completed scan or scan iteration (e.g., an indication of the system computer resource usage, total scan duration, average scan quality, and scan quality statistics). The various functions and sub-components of PMF 234 are discussed in further detail in reference to FIGS. 3 and 7

QMF 236 is operable (a) to estimate scan quality metrics based on a particular proposed scanning plan 106 and/or (b) to prepare scan quality metrics for an ongoing scan that is being performed according to a scanning plan 106 and to evaluate scan quality metrics for a completed scanning plan 106 (or a completed iteration of a repeating scanning plan 106). Such scan quality metrics include but are not limited to precision, recall, negative predictive value, sampling confidence, detection confidence, scanning coverage, and scan accuracy (e.g., F1 score). Such scan quality metrics may be aggregated at various levels (e.g., model level, dataset level). In various embodiments, QMF 236 is operable receive user-confirmation of scan results to establish benchmarks, to receive scan performance metrics from PMF 234, and to analyze the scan performance metrics against benchmarks to generate the scan quality metrics. In some embodiments, such benchmarks may also be used to provide estimated scan quality metrics. In various instances, such analysis includes but is not limited to performing various statistical analyses, using machine-learning algorithms to extrapolate scan quality metrics based on prior scan quality metrics, and/or applying scan performance metrics to preexisting models that output scan quality metrics. QMF 236 is operable to provide the estimated scan quality metrics based on a first set of scan objectives to SCPU 232, receive one or more indications of changes to the scan objectives that result in a second set of scan objectives, and then provide estimated scan quality metrics based on the second set of scan objectives. In various embodiments, QMF 236 is operable to collect scan quality metrics during an ongoing scan and make such scan quality metrics available to visualization module 250 directly, or via SCPU 232 such that visualization module 250 is operable to generate a visualization of the progress of an ongoing scan. Similarly, QMF 236 is operable to make scan performance data (or evaluations thereof) of a completed scan (or a completed iteration of a scan) available to visualization module 250 directly, or via SCPU 232 such that visualization module 250 is operable to generate a visualization of the performance of the completed scan or scan iteration (e.g., an indication of the actual sampling confidence, actual detection confidence, and accuracy of the completed scan). The various functions and sub-components of QMF 236 are discussed in further detail in reference to FIGS. 3 and 6.

In various embodiments, backend service and API gateway module 238 enables access to scanner 104 via other applications (e.g., user interface 102). In various embodiments, backend service and API gateway module 238 is operable to provide an API to other applications, receive API requests for scanner 104 to perform a function, and return a result to the other application. In various embodiments, scanner 104 includes a scanner admin console 240 that is operable to provide administrator-level access to scanner 104. In various embodiments, administrator-level access enables a user 110 to manage scanning plans 106 (e.g., adding, changing, copying, or deleting scanning plans 106), configure various aspects of scanner 104 (e.g., by adding or removing components such as classifiers 206, adjusting the API), accessing logs or error reports generated by various components, monitor the execution of currently-running scanning plans 106, etc.

Visualization module 250 is operable to convert output from controller modules 230 into representations to present to user 110 (e.g., on user interface 102). In various embodiments, such representations may be visual (e.g., charts, tables, etc.), audible (e.g., computer-generated speech), tactile, or any combination.

Metadata service module 260 is operable to prepare metadata corresponding to datastores 120 that are identified for scanning and update such metadata to reflect the results of ongoing and completed scans. Metadata service module 260 is operable to store metadata about the various scanning plans 106 including but not limited to information about how many iterations have been performed for a given scanning plan 106, how many iterations remain for a given scanning plan, whether various ongoing scanning plans 106 have encountered errors or other issues, how many datastores 120 have been ingested, and how many tasks are running. Such information may be made available to various components of scanner 104 as discussed herein. Metadata service module 260 is also operable to store metadata related to datastores 120. Such metadata for a particular datastore 120 includes but is not limited to data source types (e.g., type of database such as MySQL or ORACLE), data item types (e.g., string, number, CLOB, BLOB, etc.), number of objects/tables/columns/rows in a particular datastore 120, data length/size, and a number of preexisting scanning plans 106 that scan the particular datastore 120. After a particular datastore 120 has been scanned at least once, information learned from the previous scans may also be recorded with metadata service module 260 including but not limited to a list of data classes detected in the particular datastore 120, a list of regions previous identified for the particular datastore 120, a number of linking fields previously identified in the particular datastore 120, the resource usage of the previous scan, and the execution duration of the previous scans.

Figure 3:
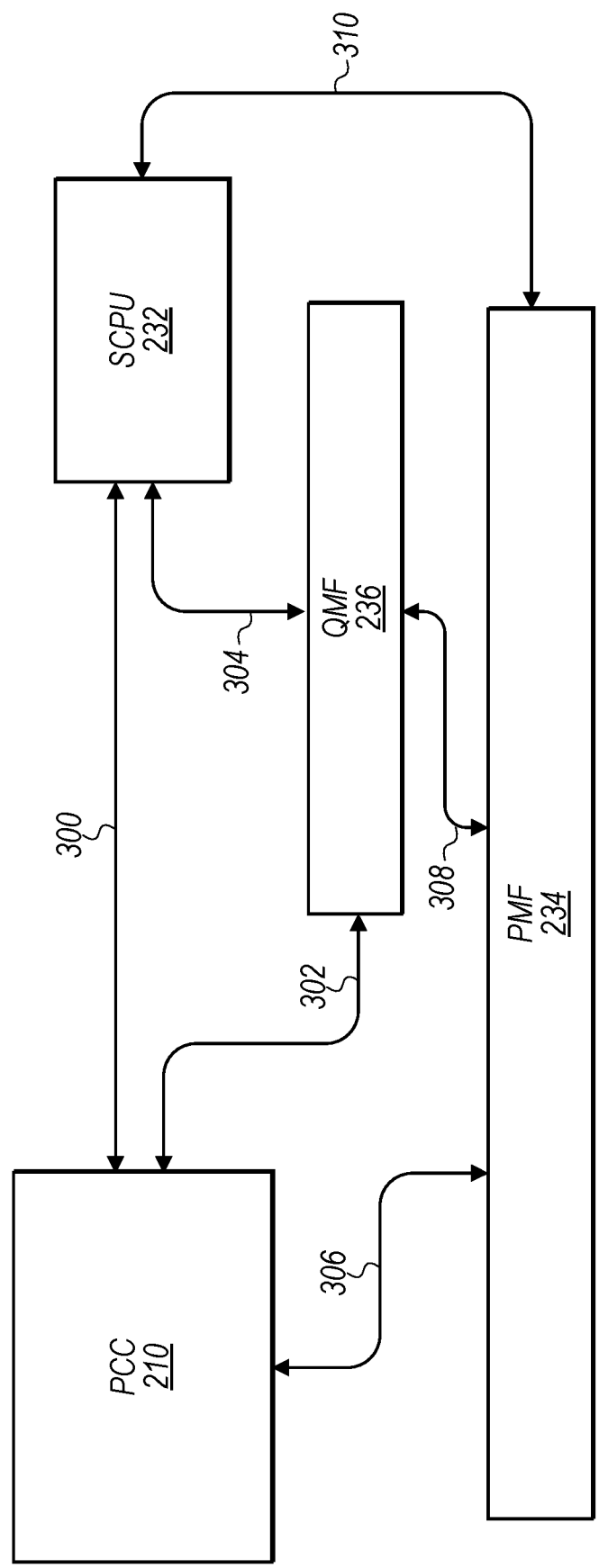
FIG. 3 is a flowchart illustrating information flows between various components shown in FIG. 2 in accordance with various embodiments.

FIG. 3 is a flowchart illustrating information flows between PCC 210, SCPU 232, PMF 234, and QMF 236 in accordance with various embodiments.

As illustrated by line 300, PCC 210 and SCPU 232 exchange information to prepare a proposed scanning plan 106 or to determine how to perform a subsequent scan using a preexisting scanning plan 106. Such information includes but is not limited to determining which classifiers 206 to use during a scan, adjusting the functions of one or more classifiers (e.g., revising decision trees, adjusting weights of models), adjusting how samples are taken from datastores 120 (e.g., by increasing or decreasing sampling rates, by skipping certain portions of data stores). As discussed herein, a determination of which classifiers 206 to use during a subsequent scan performed using a particular scanning plan 106 may be based on prior results (e.g., scan performance metrics and/or scan quality metrics from a previous scan). For example, if SCPU 232 determines that one or more previous scans of a particular datastore 120 indicated that a particular type of data record (e.g., images, data records with particular types of information like names and addresses) are more or less prevalent in datastore 120 than previously expected, the classifiers 206 used during a subsequent scan may be changed accordingly (e.g., using a classifier 206 more attuned to image processing, using a classifier 206 that is more attuned to separating names and addresses that are PII from names and addresses that are not such as names and addresses of businesses). As a second example, the function of classifiers 206 and/or the sampling of data records may be adjusted. For example, if SCPU 232 determine that determines that one or more previous scans of a particular datastore 120 indicated that a particular type of data record is more or less prevalent in datastore 120 than previous excepted, the sampling rate may be increased (e.g., if there is more PII than expected) or may be decreased (e.g., if there was less PII than expected). Further, if a portion of a datastore 120 is unchanged from the previous scan, that portion may be skipped and not sampled at all during a subsequent scan.

As illustrated by line 302, PCC 210 and QMF 236 exchange information. In particular, PCC 210 is operable to provide one or more measurements of classification quality to QMF 236. Such measurements of classification quality include but are not limited to true positive rate, true negative rate, and false positive rate.

As illustrated by line 304, QMF 236 exchanges information with SCPU 232. In particular, QMF 236 sends scan quality metrics to SCPU 232 to prepare a proposed scanning plan 106 or to determine how to perform a subsequent scan using a preexisting scanning plan 106. As a first example, estimated scan quality metrics may be sent to SCPU 232 for SCPU 232 to use to determine (with or without input from user 110) whether scan objectives should be adjusted to meet scan quality and scan duration preferences input by user 110. As a second example, the scan quality metrics from one iteration of a scanning plan 106 may be sent to SCPU 232 to use to make adjustments for subsequent scans using that scanning plan 106 (or other scanning plans 106).

As illustrated by line 306, PCC 210 and PMF 234 exchange information. In particular, in various instances PCC 210 may send scan performance information collected as a result of sampling datastores 120 and/or applying classifiers 206 to PMF 234. Such scan performance information may include but is not limited to: metadata collection, scan progress statistics (e.g., what datastores 120 have been sampled, how much has been sampled, how much sampled data has been successfully classified), scan health status, system computer resource usage by classifiers 206, and scan progress statistics (e.g., what datastores 120 have been sampled, how much has been sampled, how much sampled data has been successfully classified), scan velocity, and scan quality statistics.

As illustrated by line 308, PMF 234 exchanges information with QMF 236. In particular PMF 234 sends various collected scan performance metrics to QMF 236 for use in the calculation of scan quality metrics as discussed herein in reference to FIG. 6. As illustrated by line 310, PMF 234 exchanges information with SCPU 232. In particular, PMF 234 sends estimated and calculated scan performance metrics to SCPU 232 including but not limited to providing a scan velocity and/or scan duration estimation to SCPU 232 for use in forming a proposed scanning plan 106 and providing an indication to user 110 of an estimated duration for a particular proposed scanning plan 106.

Figure 4:
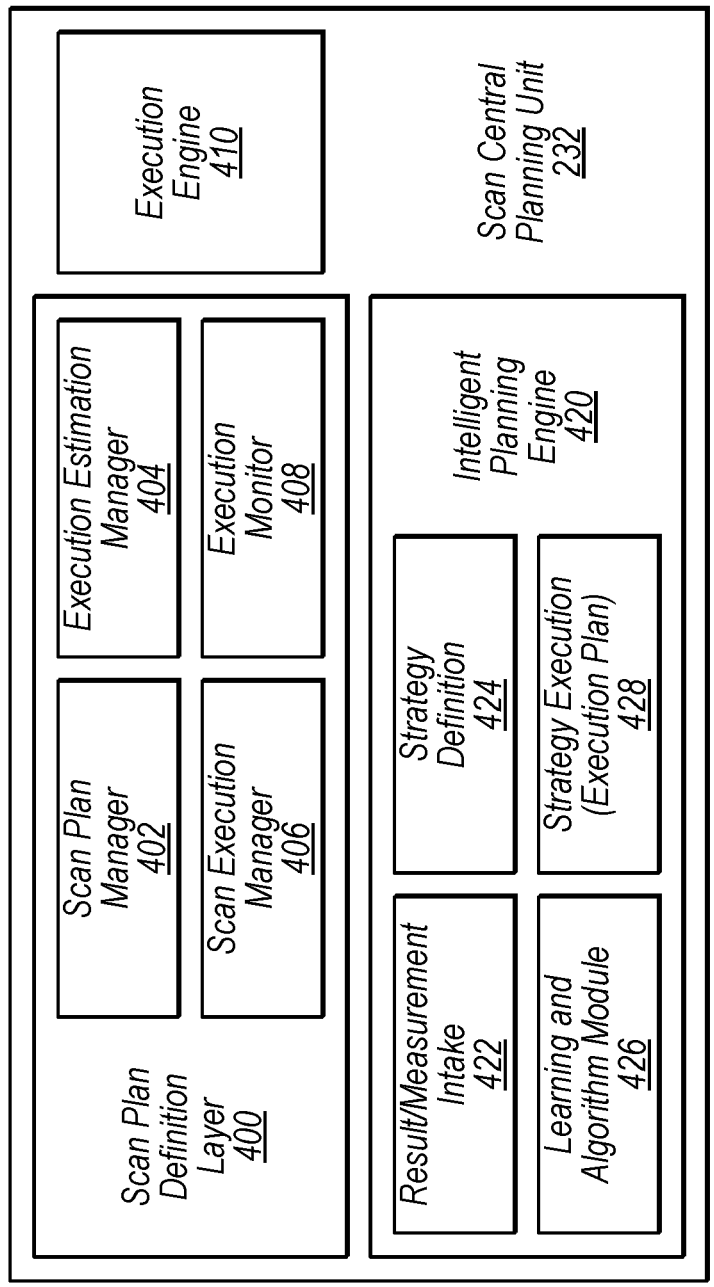
FIG. 4 is an expanded block diagram of the scan central planning unit of FIG. 2 in accordance with various embodiments.

FIG. 4 is an expanded block diagram of SCPU 232 in accordance with various embodiments. As defined herein, SCPU 232 and its various components are implemented as modules. In various embodiments, SCPU 232 includes a scan plan definition layer module 400, an execution engine 410, and an intelligent planning engine 420.

In various embodiments, scan plan definition layer 400 includes a scan plan manager 402, an execution estimation manager 404, a scan execution manager, and an execution monitor 408. As discussed herein, scan plan definition layer 400 is operable to perform the various actions relating to preparing a proposed scanning plan 106 and to managing and monitoring existing scanning plans 106. Scan plan manager 402 is operable to perform various actions associated with saving, modifying, and/or deleting information defining various scanning plans. Execution estimation manager 404 is operable to determine various estimates for the execution of a proposed scanning plan 106 based on information received from PCC 210, PMF 234, and/or QMF 236 such that these estimates may be presented to user 110. For example, execution estimation manager 404 is operable to determine an estimated scan duration for a proposed scanning plan based on scan velocity information received from PMF 234 and estimated scan quality metrics received from QMF 236. Scan execution manager 406 is operable to assemble the various tasks associated with performing a scan (e.g., when to run which classifier 206 on which datastore 120) into a scanning plan 106. Execution monitor 408 is operable to monitor the health and status of existing scanning plans 106 (e.g., monitor whether a scanning plan 106 has completed all scans, monitoring whether a scanning plan 106 has had to be prematurely terminated).

Execution engine 410 is operable to execute the various tasks associated with performing the scan according to a scanning plan 106 at runtime. In various instances, this includes running the scanning tasks performed with classifiers 206, regional detection module 212, and identification module 214.

In various embodiments, intelligent planning engine 420 includes a result/management intake module 422, a strategy definition module 424, a learning and algorithm module 426, and a strategy execution module 428. As discussed herein, intelligent planning engine 420 is operable to perform the various actions relating to using the results of previous scans (or previous iterations of scans) to inform or improve the performance of subsequent scan according to a particular scanning plan 106. Results/measurements intake module 422 is operable to receive scan performance metrics from PMF 234, and received scan quality metrics from QMF 236.

Strategy definition module 424 is operable to store definitions of various strategies for execution of a scan iteration strategy. For example, strategy definition module 424 is operable to store the various sampling strategies discussed in connection to FIG. 10B.

Learning and algorithm module 426 is operable to adjust the performance of subsequent scans using machine learning techniques based on results of prior scans. For example, a prediction model may be generated from the results of prior scans, an indication of changes made after the prior scans, and the results of subsequent scans. This prediction model may be used to evaluate the results of scan made with a particular scanning plan 106 and predict how changes in subsequent scans (e.g., changing classifiers 206 that are used, changing sampling rates, changing sampling strategies) would affect subsequent scans with the particular scanning plan 106.

Strategy execution module 428 is operable to apply the metrics received by results/measurements intake module 422 to the various strategies maintained by strategy definition module 424 to compile the logical execution plan for the scan iteration strategy. In various embodiments, the generation of the scan iteration strategy is rule-based (e.g., if X then Y) and/or may be generated using machine-learning techniques (e.g., when conditions A, B, and C, then a machine-learning model indicates D).

As discussed herein, in many instances a particular scanning plan 106 is iteratively performed. In various instances, SCPU 232 coordinates such iterative scans. In various embodiments, SCPU 232 is operable (using strategy definition module 424 and strategy execution module 428) to apply various post-scanning strategies to iterative scans in an effort to reduce the amount of effort spent rescanning data records. For example, SCPU 232 may employ a first strategy to reduce heavy identification efforts or a second strategy to reduce re-scanning previously-scanned data records:

Example Strategy 1—Reduce Heavy Identification Efforts

In the first example strategy in which a reduction in heavy identification efforts is prioritized, a particular datastore 120 (or particular portion of a datastore 120) that is included in a particular scanning plan 106 has been fully or partially scanned (e.g., with sampling). When the scan is iterated, SCPU 232 uses the prior results to determine if that particular datastore 120 (or particular portion of a datastore 120) has been classified as "None" (i.e., having no sensitive information). If the particular datastore 120 (or particular portion of a datastore 120) has been classified as "None," SCPU 232 checks the detection confidence calculated by QMF 236. If the detection confidence is above a threshold (e.g., 60%), the particular datastore 120 (or particular portion of a datastore 120) is skipped in the next iteration, but if it is below a threshold, it is re-sampled and scanned in the next iteration.

Conversely, if the particular datastore 120 (or particular portion of a datastore 120) has not been classified as "None," then SCPU 232 uses the prior results to determine what percentage of the sensitive information is of a particular type (e.g., the sensitive information is PII that falls under a particular PII governance regulation such as being PII of EU residents). If the percentage is above a first threshold (e.g., 50% of the identified data records correspond to EU residents) then the particular datastore 120 (or particular portion of a datastore 120) is fully scanned to attempt to identify all relevant data records in the next iteration. If the percentage is below a second threshold (e.g., 10% of the identified data records correspond to EU residents), then the particular datastore 120 (or particular portion of a datastore 120) is skipped in the next iteration. The percentage is between the first threshold and second threshold, the particular datastore 120 (or particular portion of a datastore 120) is re-sampled and scanned in the next iteration.

Example Strategy 2—Reduce Re-Scanning Efforts

In the second example strategy in which a reduction of re-scanning efforts is prioritized, a particular datastore 120 (or particular portion of a datastore 120) that is included in a particular scanning plan 106 has been fully or partially scanned (e.g., with sampling). When the scan is iterated, SCPU 232 uses the prior results to determine if there has been a schema change for the particular datastore 120 (or particular portion of a datastore 120). If there has been no schema change, SCPU 232 determines if the particular datastore 120 (or particular portion of a datastore 120) has had a change in its row count. If the row count has been changed, the particular datastore 120 (or particular portion of a datastore 120) is rescanned on the next iteration. If the row count has not changed, then SCPU 232 checks the sampling confidence determined by QMF 236. If the sampling confidence is above a threshold, the particular datastore 120 (or particular portion of a datastore 120) is skipped in the next iteration, but if the sampling confidence is below the threshold the particular datastore 120 (or particular portion of a datastore 120) is rescanned in the next iteration.

Conversely, if the schema (e.g., data structure) for the particular datastore 120 (or particular portion of a datastore 120) has changed, SCPU 232 determines if the particular datastore 120 (or particular portion of a datastore 120) also has had a change in its row count. If the row count has been changed, the particular datastore 120 (or particular portion of a datastore 120) is rescanned on the next iteration. If the row count has not changed, then SCPU 232 checks the sampling confidence determined by QMF 236. If the sampling confidence is above a threshold, SCPU 232 determines that a new column has been added particular datastore 120 (or particular portion of a datastore 120), adjusts metadata about the particular datastore 120 accordingly, and rescans the particular datastore 120 on the next iteration using the updated metadata. If the sampling confidence is below the threshold the particular datastore 120 (or particular portion of a datastore 120) is simply rescanned in the next iteration.

As discussed herein, SCPU 232 is operable to act as the "brain" of scanner 104, and coordinates the various components of scanner 104 to propose and perform scanning plans 106. As discussed in further detail in reference to FIG. 8, SCPU 232 receives indications of scanning scope, receives metadata for the one or more datastores 120 and results from prior scans, and determines scan objectives based on input form user 110 and from its own determinations based on the results from prior scans. SCPU 232 is also operable to receive information from PMF 234 that is indicative of resource availability, resource usage, resource management, and scanning performance estimation; receive information from PCC 210 indicative of the classifiers 206 selected for a scan and of the execution of classifications; and receive from QMF 236 information indicative of confidence levels (e.g., scanning confidence, sampling confidence) and of accuracy of a scan. Using this received information, SCPU 232 is operable to present information to user 110 as discussed here, to execute scans, and to present results of scans to user 110 in various reports.

Figure 5:
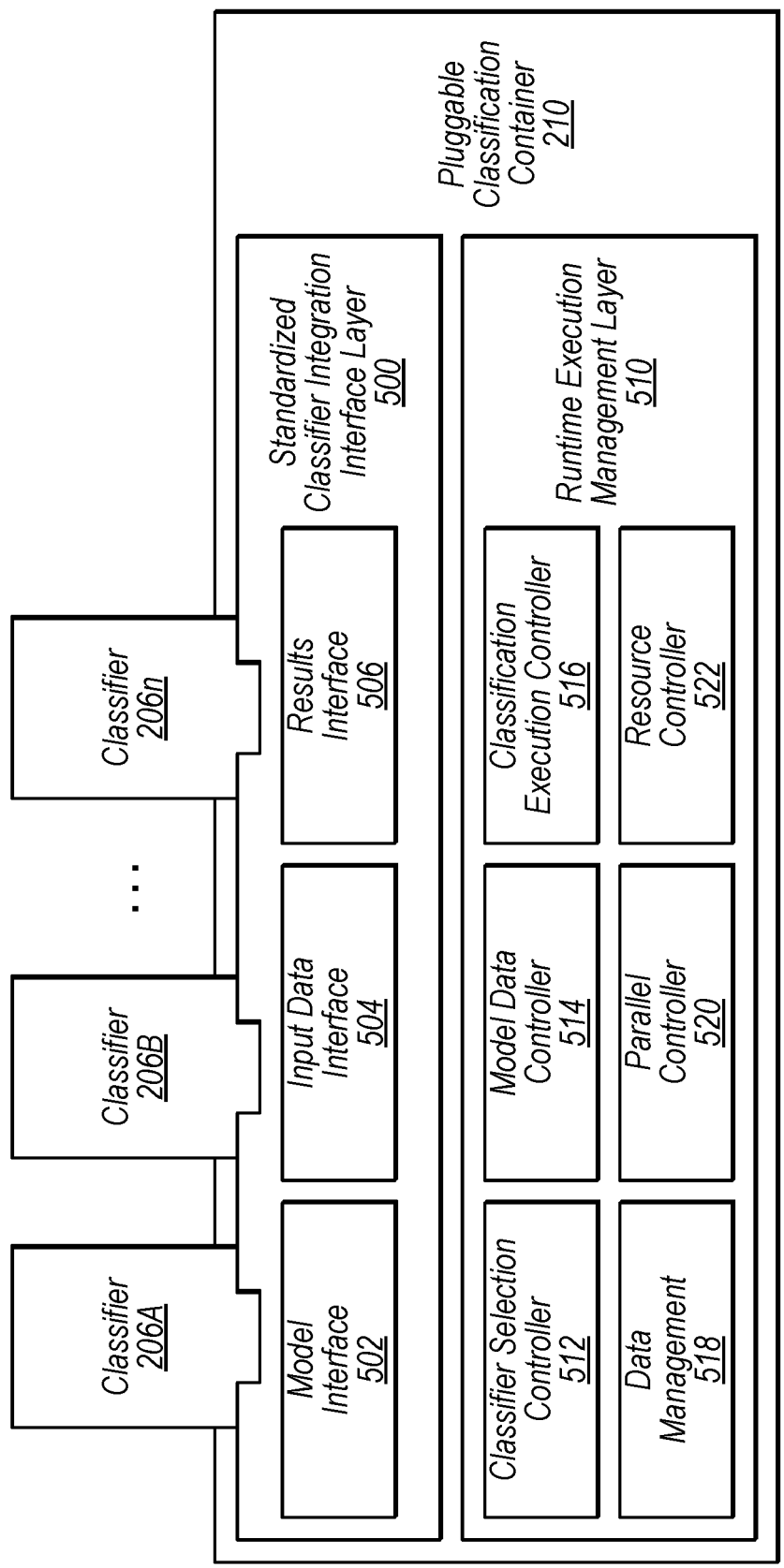
FIG. 5 is an expanded block diagram of the pluggable classification container of FIG. 2 in accordance with various embodiments.

FIG. 5 is an expanded block diagram of PCC 210 in accordance with various embodiments. As defined herein, PCC 210 and its various components are implemented as modules. In various embodiments, PCC 210 receives a plurality of classifier modules 206 using a standardized classifier integration interface layer 500. In various embodiments, PCC 210 also includes a runtime execution management layer 510.

In various embodiments, standardized classifier integration interface layer 500 is operable to provide a software interface for any number of various classifiers 206, and includes a model interface 502, an input data interface 504, and a results interface 506. In various embodiments, model interface 502 provides an interface for models provided by classifiers 206, input data interface 504 facilitates passing information from data records from datastores 120 (e.g., data records that have been sampled for classification) to the models provided by classifiers 206, and results interface 506 facilities receiving results determined by the models provided by classifiers 206 from the input data.

In various embodiments, runtime execution management layer 510 includes a classifier selection controller 512, a model data controller 514, a classification execution controller 516, a data manager 518, a parallel controller 520, and a resource controller 522. Classifier selection controller is operable to determine one or more classifiers 206 to apply to the datastores 120 during an initial scan. Such a determination may be based, for example, on metadata corresponding to datastore 120 and scan objectives input by user 110 in various instances. Classifier selection controller 512 is also able to determine one or more to apply to the datastores 120 during an iteration of a scan in various embodiments. As discussed herein, if the results of a previous scan indicate that applying additional or alternative classifiers in the next iteration of the scan would improve scan performance, classifier selection controller 512 is operable to determine which classifiers 206 to apply. For example, if a first scan indicates the presence of name and address data in a datastore 120, then classifier selection controller 512 may replace the previously-used classifiers 206 with a classifier 206 attuned to recognition of sensitive data in data records including name and address information. Further, the determination of classifiers 206 to apply in a subsequent iteration of a scan may also be based on input from user 110 (e.g., a selection of a particular classifier 206 to apply in a subsequent scan, a selection of a user command to increase detection confidence at the cost of increased scan duration on the next iteration, etc.).

Figure 6:
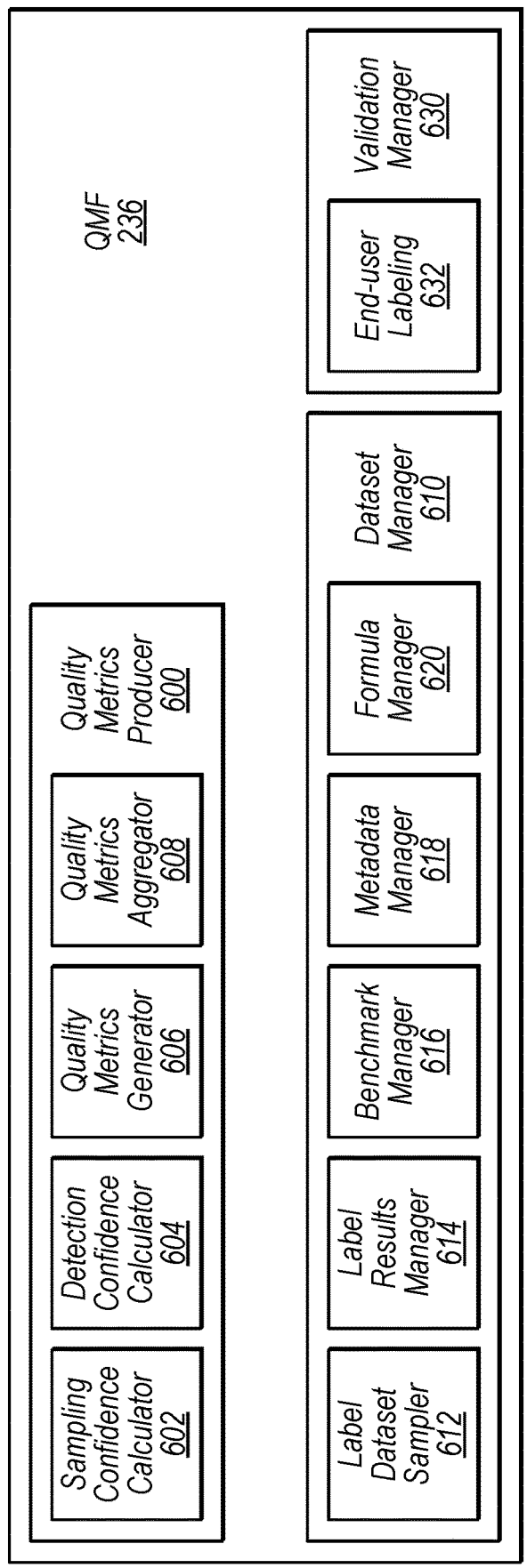
FIG. 6 is an expanded block diagram of the quality measurement framework of FIG. 2 in accordance with various embodiments.

FIG. 6 is an expanded block diagram of QMF 236 in accordance with various embodiments. As defined herein, QMF 236 and its various components are implemented as modules. In various embodiments, QMF 236 includes a quality metrics producer module 600, a dataset manager module 610, and a validation manager module 630. As discussed herein, QMF 236 is operable to receive scan performance metrics from PMF 234 and classification quality measurements from PCC 210. In various instances, QMF 236 is operable to calculate various scan quality metrics based on the received scan performance metrics and/or classification quality metrics.

In various embodiments, quality metrics producer module 600 includes a sampling confidence calculator 602, a detection confidence calculator 604, a quality metrics generator 606, and a quality metrics aggregator 608. Sampling confidence calculator 602 and detection confidence calculator 604 are useable to calculate the sampling confidence level (i.e., the confidence level of the sampling technique used to take samples from datastores 120 which may indicate whether the sampling has provided enough information to be considered representative of the larger dataset) and detection confidence level (i.e., the confidence level of the detection performed by classifiers 206, for example if a classifier 206 has determined that a column contains phone numbers, how confident classifier 206 is of that classification), respectively, for a particular iteration of a scan and/or multiple iterations of the scan.

In various embodiments, quality metrics generator 606 is operable to generate various scan quality metrics including but not limited to negative predictive value (NPV), positive predictive value (PPV, also referred to as precision), recall, and F1-score (also referred to as accuracy). NPV is useable to measure a confidence level of completeness of detection for the particular type of target information (e.g., PII). NPV is useable by SCPU 232 and user 110 to evaluate a likelihood that regulations (e.g., PII governance regulation) are complied with and to guard against false negatives. PPV is useable to measure the cost-efficiency (in terms of computer system resources and time spent scanning) of protecting the particular type of target information. PPV is useable by SCPU 232 and user 110 to determine how much of the data protection efforts are being spent to protect target information and to guard against false positives. Recall is useable to measure what percentage of positively identified data records (i.e., data records identified as including the particular type of target information) were predicted correctly by the classifiers 206 used from a full set of the actually positive items. This metric, for example, can be used by SCPU 232 to determine to remove a low-performing classifier 206 from a subsequent iteration of a particular scanning plan 106. F-1 score represents the harmonic mean of recall and precision, and is useable to evaluate the accuracy of a particular scanning plan 106. As discussed herein, quality metrics generator 606 is operable to calculate these metrics using the results of a scan (or an iteration of a scan) compared with the labeled data sources provided by end-users.

Quality metrics aggregator 608 is operable to aggregate scan quality metrics calculated at a first level of analysis into a second, different level of analysis. For example, calculated F1 score, precision, recall, and NPV calculated from a particular set of data records can be aggregated into analyses of an entire datastore 120 at a macro level or into analyses across and entire model (e.g., a model in a classifier 206). Moreover, macro-level data may be divided into more micro-level analyses such as by data records sharing one or more common characteristics (e.g., data records indicative of shared periods of time).

In various embodiments, dataset manager module 610 includes a label dataset sampler 612, a label results manager 614, a benchmark manager 616, a metadata manager 618, and a formula manager 620. Label dataset sampler 612 is operable to enable end-users (e.g., users 110) to randomly sample portions of scan results (e.g., a record that has been flagged as containing target information, and in particular Jane Doe's phone number) perform manual confirmation of the sampled scan results, Label results manager 614 is operable to coordinate the reception of user-confirmed scanning results (e.g., confirming whether the sampled scan result does or does not include target information) to enable the generation the actual scan quality metrics. In various instances, label results manager 614 receives user confirmations, maps the user confirmation to the portions of scan results sampled by label dataset sampler 612, and stores the results. Benchmark manager 616 is operable to maintain benchmark scan quality metrics useable to evaluate scan quality metrics calculated by QMF 236. Such benchmarks are also usable to estimate a target scan quality level when scanning plan 106 is being defined. Metadata manager 618 is operable to manage metadata used by QMF 236 including but not limited to metadata for data records in datastore 120, metadata for the sampled portions of scan results, metadata for user-confirmed scanning results, and metadata for calculated scan quality metrics. Formula manager 620 is operable to receive and maintain the formulas useable to calculate scan quality metrics (e.g., the formula for F1 score). In various instances, additional formulas may be added to formula manager 620, enabling additional scan quality metrics to be calculated. Validation manager module 630 includes end-user labeling module 632. Validation manager module 630 is operable to facilitate user confirmation of sampled scan results (e.g., a sample generated by label dataset sampler 612) with end-user labeling module 632 operable to present samples to the user via user interface 102 and to receive user input indicative of user confirmations.

Figure 7:
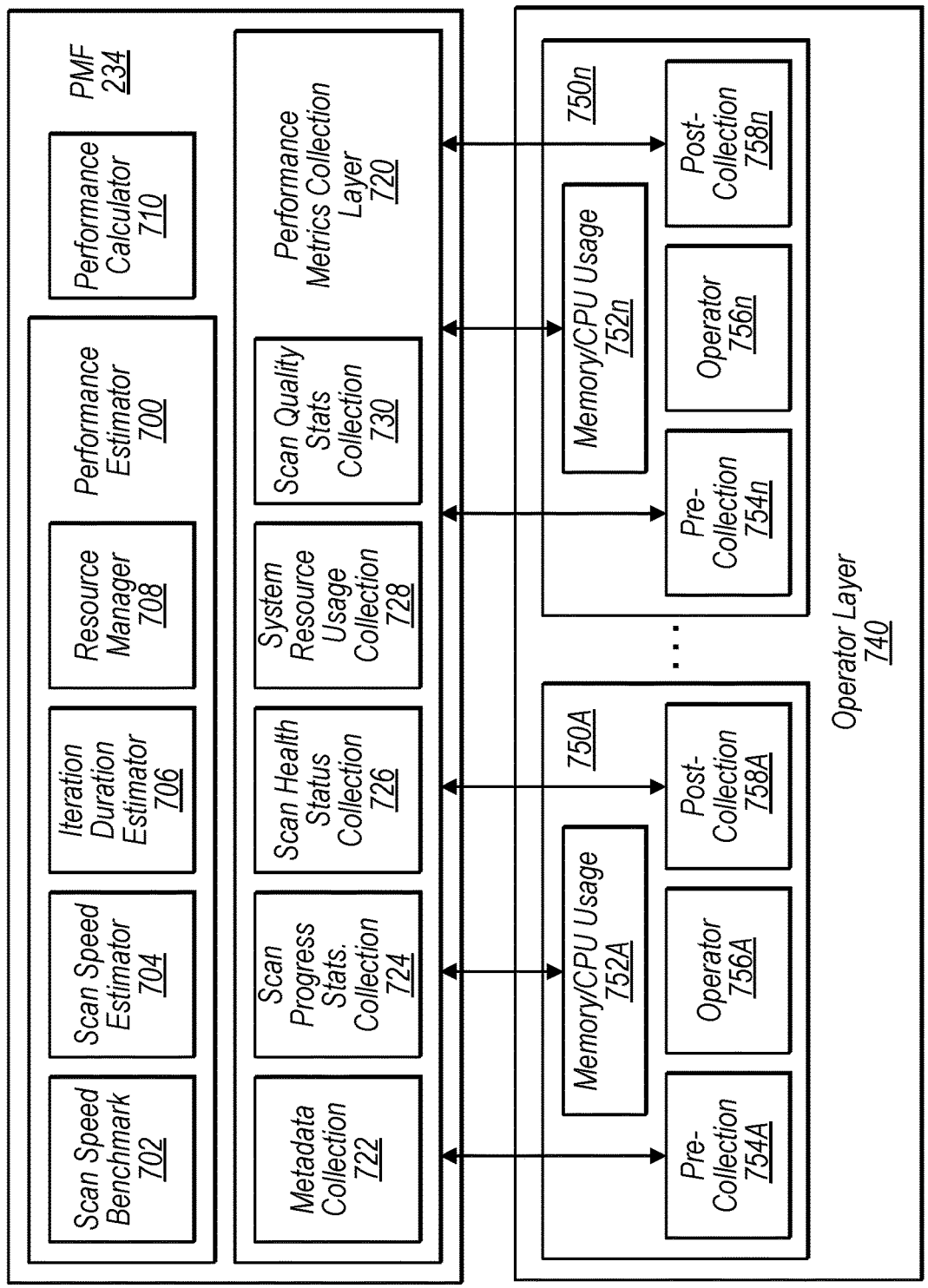
FIG. 7 is an expanded block diagram of the performance measurement framework of FIG. 2 in accordance with various embodiments.

FIG. 7 is an expanded block diagram of PMF 234 in accordance with various embodiments. As defined herein, PMF 234 and its various components are implemented as modules. In various embodiments, PMF 234 includes a performance estimator module 700, a performance calculator module 710, a performance metrics collection layer 720, and an operator layer 740.

In various embodiments, performance estimator module 700 includes one or more scan speed benchmarks 702, a scan speed estimator module 704, an iteration duration estimator 706, and a resource manager 708. In various embodiments, performance estimator module 700 receives information from PCC 210 about the resources used by the classifiers 206 that are selected to run in a scan. Scan speed estimator module 704 and iteration duration estimator 706 are operable to use this information, along with the scan speed benchmarks 702 and an indication of the available resources for the scan generated by resource manager 708, to generate estimations of scan velocity for the scan and a total duration for the scan (or an iteration of the scan) according to a particular scanning plan 106. As used here, "scan velocity" refers to one or more performance metrics of a scan per unit of time (e.g., data records scanned per minute, bytes scanned per second, etc.).

Performance metrics collection layer 720 is operable to collect metrics indicative of an ongoing or completed scan conducted according to a particular scanning plan 106. In various embodiments, performance metrics collection layer 720 includes: (a) a metadata collection module 722 that collects metadata generated during the scan; (b) a scan progress statistical collection module 724 that collects information indicative of how much of the scan has been performed and how much of the datastores 120 to be scanned have been scanned; (c) a scan health status collection module 726 which monitors the execution of the scan for errors, faults, or other runtime issues; (d) a system resources usage collection module 728 that interfaces with operator layer 740 to log information indicative of the amount of system resources (e.g., computer processor cycles, size of memory) used during a scan; and (e) a scan quality statistical collection module 730 that is operable to collect information indicative of the True Positive rate, True Negative rate, False Positive rate, and False Negative rate of the scan that are useable by QMF 236 to prepare scan quality metrics (e.g., F1, precision, etc.). Performance calculator module 710 is operable use the information collected by performance metrics collection layer 720 to calculate scan performance metrics including but not limited to scan progress statistics, scan health status (e.g., whether a scan has incurred an error and had to be terminated prematurely), system computer resource usage (e.g., degree of parallelism, number of processors used in a single scan iteration and/or in total, size of memories used in a single scan iteration and/or in total), and scan velocity.

Operator layer 740 is operable to monitor computer system 100 as various operations performed by during a scan are performed. In various embodiments, operator layer 740 include a plurality of operator packages 750 that include various modules running along with a particular operator 756. In various embodiments, operator packages 750 include a memory/CPU usage module 752, a pre-collection module 754, and a post-collection module 758. As shown in FIG. 7, any number of operator packages 750 may be present (e.g., operator package 750A, operator package 750n) to run any number of various modules (e.g., memory/CPU usage module 752A, memory/CPU usage module 752n) that operate along with any number of operators 756 (e.g., operator 756A, operator 756n).

As discussed herein, various tasks are performed during a scan. These tasks are represented as operators 756. For example, if a particular classifier 206 is being run, various operations are performed to attempt to classify data records as discussed herein. In various embodiments, operator packages 750 are generated dynamically as operations are performed. As the operator 756 runs, memory/CPU usage module 752 is operable to capture system resource usage including but not limited to memory usage and CPU usage incurred by operator 756 in various embodiments. In various embodiments, pre-collection module 754 and post-collection module 758 are operable to collect snapshots of computer system 100 just prior to and just after operator 756 runs, respectively, including but not limited to the data records taken as inputs and data records produced as outputs. Accordingly, the various modules 752, 754, 758 gather information relating to the memory usage of operator 756, the CPU usage of operator 756, information about the data records accessed by operator 756 as inputs, and information about the data records produced by operator 756 as outputs. This information is reported to performance metrics collection layer 720. Using this information, PMF 234 is operable to understand on a per-operation level, the resource usage level of various operations and to understand that with a given amount of computer system resources, a certain number of operations can be processed. In various instances, this information is usable to estimate the amount of time needed to perform various operations given the amount of resources. Further, this information can be used for resource planning to determine whether to speed up a scan by making additional resources available or to slow down a scan by allocating some resources to other processes. Further, the framework provided by operator packages 750 is flexible such that additional data-collection modules can be added per operator 756 to gather additional information as desired.

In various embodiments in which the target information for a scan is PII, PMF 234 and QMF 236 are operable to generate a set of scan performance metrics and scan quality metrics usable by user 110 to evaluate the efficacy and efficiency of a PII scan performed according to a particular scanning plan 106. These metrics include metrics that are indicative of the detection and identification of sensitive information and metrics that are indicative of operation and administration of scans.

Detection and Identification Metrics

In various embodiments, detection and identification metrics include two categories: (a) asset level privacy measurements and (b) privacy and individual measurements.

Asset level privacy measurements include asset volume analyses and privacy data analyses in various embodiments. Any of these measurements may be broken down into separate metrics for structured, unstructured, and image data records. Asset level privacy metrics are indicative of the number of individual environments, databases, tables, records, columns, files etc. in datastore 120 to be scanned. Asset level privacy metrics are usable to show the overall scope of data assets that will be scanned. Privacy data analyses are indicative of a number of types of PII detected (e.g., names, addresses, email addresses are separate PII types), a number of data objects by privacy types and distribution at different levels of datastores 120 (e.g., levels of a hierarchical data structure stored in datastore 120), and a percentage of columns or objects with PII to overall data at different levels of datastores 120. In various instances, PII may be detected at high level of granularity with some tables, columns, or rows identified as containing PII but other tables, columns, or rows being identified as not having PII. In various instances in which unstructured data is scanned for PII, PII might be detected within a specific folder, a specific file, or even a specific portion of a specific file according to some embodiments. Privacy data analyses are usable to show a high-level number of privacy data detected, a distribution of privacy data distribution, and a percentage of overall data that includes PII.

Privacy and individual measurements include privacy data object regional ratio analyses, individual regional ratio analyses, and individual privacy profiling analyses in various embodiments. Any of these measurements may be broken down into separate metrics for structured, unstructured, and image data records. Privacy data object regional ratio analyses are indicative of a number of data objects including PII broken down by region and the percentage (e.g., 50% EU PII, 25% California PII, 25% South Korea PII) and a region ratio distribution by ratio range. Individual regional ratio analyses are indicative of the number of identified individuals by region and by percentage (e.g., 100 EU individuals or 20% and 50 California individuals of 10% in a corpus of 500 total individuals). Individual privacy profiling analyses are useable to show a number of individuals broken down by different types of PII detected and different percentages of individuals associated with different types of PII, and a number of individuals broken down into segments by the number of data objects that include PII corresponding to the various individuals (e.g., John Smith is associated with 100 data objects, Jane Johnson is associated with 200 data objects).

Operation and Administration Metrics

In various embodiments, operation and administration metrics includes four categories: (a) scanning health, progress and coverage measurements, (b) scanning quality performance and confidence measurements, (c) cost efficiency analysis measurements, and (d) system health monitoring measurements.

Scanning health, progress and coverage measurements include scanning health monitoring, scanning progress reports, and scanning coverage analyses in various embodiments. Any of these measurements may be broken down into separate metrics for structured, unstructured, and image data records. Scanning health monitoring includes is indicative of a total number of scanning jobs, a number of successfully completed scanning jobs, a number of failed scanning jobs, and a success rate. In various embodiments, scanning health monitoring is also indicative of scanning jobs that have been running longer than the historical average. Scanning progress reports are indicative of a number of finished scanning iterations broken down by individual scanning plan 106 and the percentage of the overall scan that has been completed (e.g., a scanning plan 106 for which 50% of the iterations have been completed). Scanning progress reports are also indicative of the total number of active scanning plans 106, finished scanning plans 106, and disabled scanning plans 106 in various embodiments. Scanning coverage analysis are indicative of the number of data sources scanned, the number of scanned data objects at different level as a percentage of the target for that level, and the percentage of scanned data objects in an overall data volume or datastore 120.

In various embodiments, scanning quality performance and confidence measurements include scanning quality performance reports and scanning confidence analyses. Scanning quality performance reports can be broken down by classifier quality performance and dataset scanning quality performance, both of which may be further broken down into separate metrics for structured, unstructured, and image data records. Classifier quality performance is indicative of NPV, PPV, recall, and F-1 score broken down by individual classifier 206. Dataset scanning quality is indicative of NPV, PPV, recall, and F-1 score broken down by individual datastore 120 (or portions of datastore 120). Scanning confidence analysis is only applicable to structured data records in various embodiments. Scanning confidence analysis is indicative of a percentage and distribution by range of confidence level and a percentage of high/middle/low confidence level data objects. Scanning confidence analysis is useable to show the overall scanning confidence distribution for all classifiers 206 for structured data records and to identify scanning gaps from the confidence level distribution.

In various embodiments, cost efficiency analysis is indicative of a number of tables fully scanned, sampling scanned, not scanned, reports indicative of estimated scanning durations for scanning plans 106, a list of a number of longest running jobs broken down by classifier category (e.g., classifiers for structured, unstructured, and image data records), a list of a number of jobs that have increased in duration broken down by classifier category (e.g., classifiers for structured, unstructured, and image data records).

In various embodiments, system health monitoring measurements are indicative an accounting of computer system resources including a number of total computer systems, active computer systems, and inactive computer systems, a number of total services, active service, and inactive services, a number of live datastores 120, system resource usage percentage (CPU/memory/disk etc.), a number of API call broken down by services and period of time.

No. of requests (API calls) by services by time bucket. Accordingly, system health monitoring measurements are usable to shown the overall environmental health of computer system 100 and datastores 120.

As defined herein, scanner 104 is implemented as a platform and the various components shown in FIGS. 2-7 are implemented as modules. The separation of the various components into discrete modules in FIG. 2 is non-limiting and is merely for the purposes of discussion: various modules represented as separate components could be implemented together as one module, for example. Moreover, the operations performed by a particular module may be further divided into various sub-modules.

Figure 8:
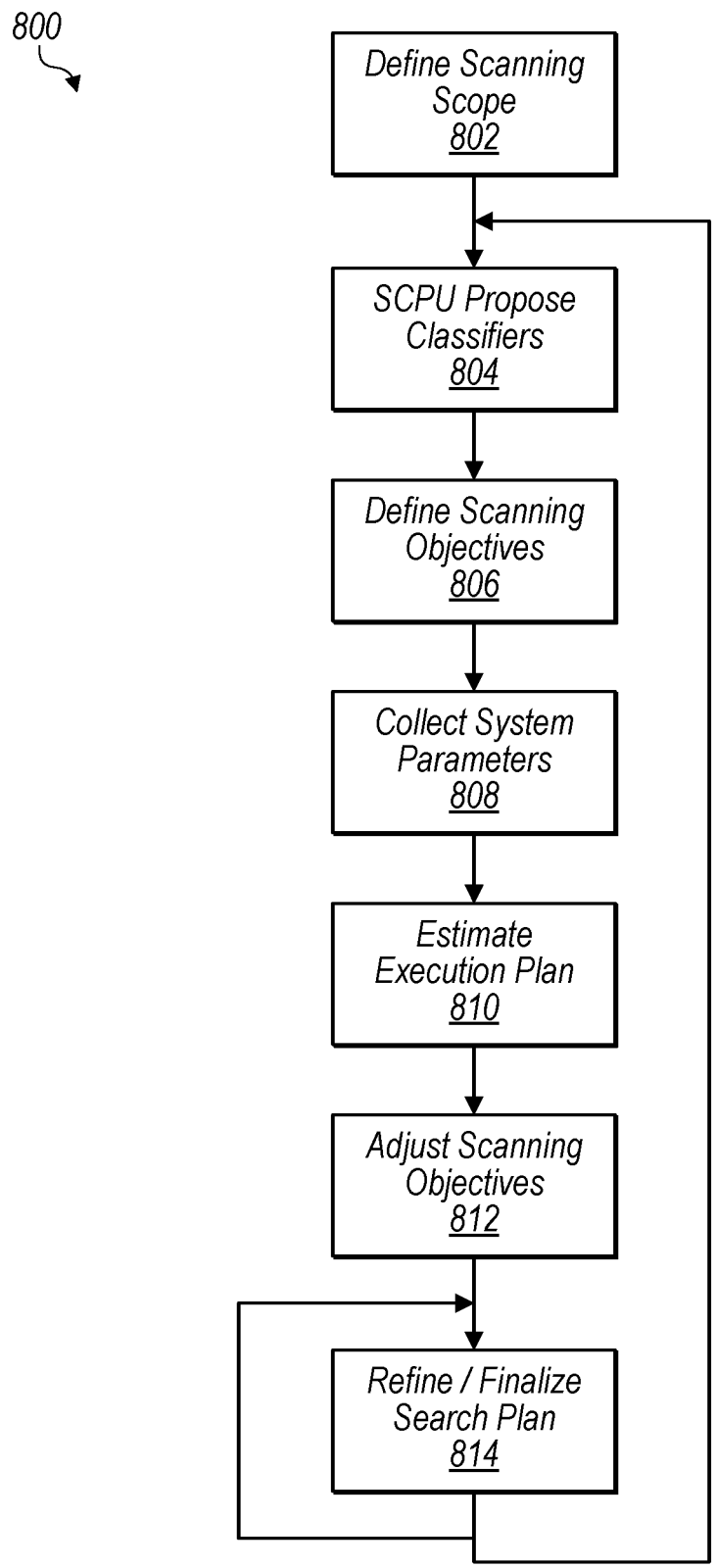
FIG. 8 is a flowchart illustrating an embodiment of a scanning plan generation and implementation method in accordance with various embodiments.

FIG. 8 is a flowchart illustrating an embodiment of a scanning plan generation and implementation method 800 in accordance with various embodiments. In the embodiment shown in FIG. 8, the various actions associated with method 800 are implemented by scanner 104.

Figure 9:
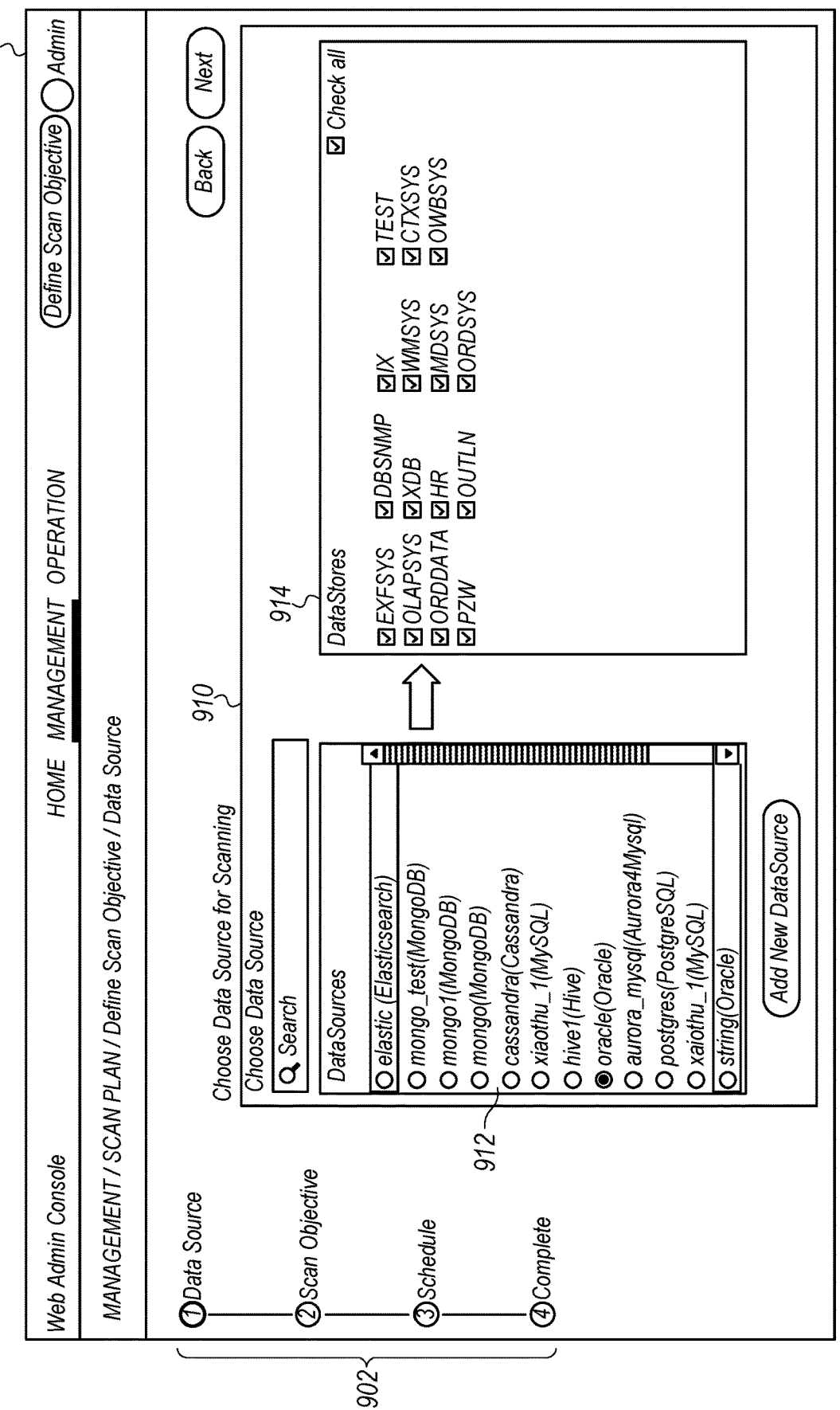

At block 802, a user 110 defines the scope of the scanning plan 106 including indicating one or more datastores 120 to be scanned. In various instances, datastores 120 are indicated by name, IP address, or network location. In various embodiments, user 110 selects the datastores 120 to be scanned as shown in FIG. 9.

At block 804, SCPU 232 proposes one or more classifiers 206 to apply during the proposed scanning plan 106 (or a subsequent iteration of a particular scanning plan 106). In various instances, the classifiers 206 to apply during the scan is determined based on information from PCC 210 about the classifiers 206 that are installed and available for use. In various embodiments, the determination of which classifiers 206 to apply during a scan is based on metadata about datastores 120 to be scanned. Such metadata includes but is not limited to the types of data sources in datastores 120 (e.g., tables, databases, etc.); the data item types in datastores 120 (e.g., string, number, CLOB, BLOB, etc.); a number of data objects, tables, columns, and/or rows to be scanned, a length and size of the data to be scanned, and a number of preexisting scanning plans 106 that scan the data to be scanned. In some embodiments where the scan is an iteration of a previously-performed scanning plan 106, the determination of which classifiers 206 to apply during a scan is also based on results from one or more prior scans including but not limited to a list of data classes detected during the previous scan(s); a number of different regions detected (e.g., different regions covered by different PII regulations); a number of linking fields detected; the computer system resource usage of the prior scan(s); and the execution durations of the prior scan(s).

Figure 10A:
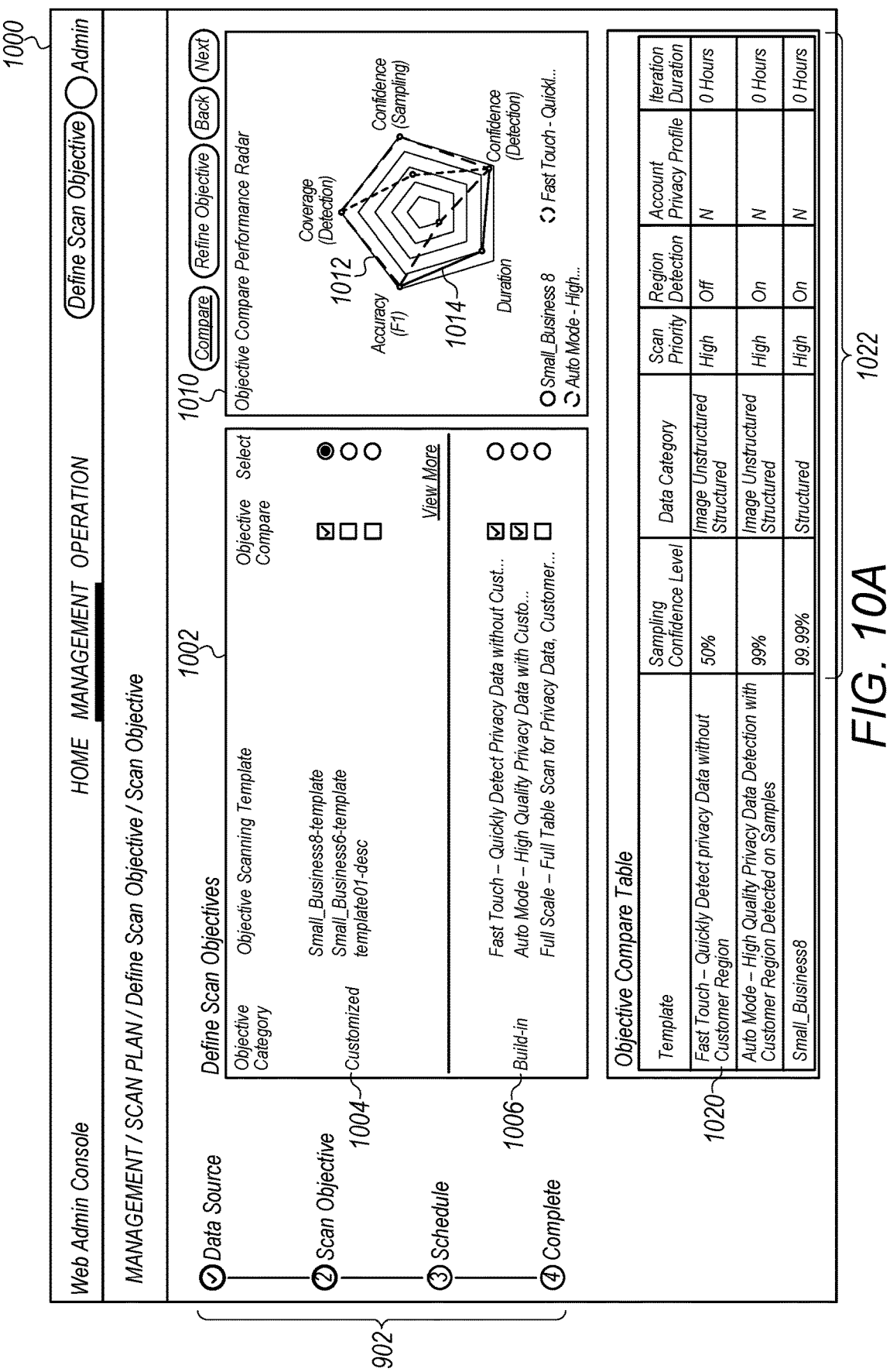

At block 806, scan objectives are defined. In some instances, one or more scan objectives are input by user 110 via user interface 102 as shown in FIGS. 10A and 10B. In some instances, scan objectives are also defined based on the results from one or more prior scans including but not limited to a list of data classes detected during the previous scan(s); a number of different regions detected (e.g., different regions covered by different PII regulations); a number of linking fields detected; the computer system resource usage of the prior scan(s); and the execution durations of the prior scan(s).

At block 808, PMF 234 collects system-wide parameters that are available as resources to be used to perform the scan and sends this information to SCPU 232. This information about available resources includes but is not limited to the current system workout (e.g., the number of scan jobs currently running and/or scheduled to run when the scan is scheduled to run), the available computer system resources (e.g., number of CPUs/GPUs, total size of memories, number and specifications of available nodes, number of idle CPUs/GPUs in each node in upcoming time periods, and a size of free memories in each not in upcoming time periods), and environmental parameters (e.g., the install state of scanner 104 (cluster versus standalone), available time windows for data ingestion, and the size of the driver dataset (e.g., a dataset of individual dossiers with names, address, etc. of individuals used to facilitate identification of a particular person with identified PII). In various embodiments in which scanner 104 is implanted using a distributed framework, collected system-wide parameters may also include a number and specifications of worker nodes, and external distributed resource management computer environment specifications.

At block 810, SCPU 232 receives estimates for the scan performance metrics and scan quality metrics of the proposed scanning plan 106 (or the iteration of an existing scanning plan 106) including the accuracy of the scan, scan coverage of the scan, sampling confidence of the scan, detection confidence of the scan, and duration of the scan based on the currently-selected scan objectives. In some embodiments, SCPU 232 receives estimates for the scan performance metrics and scan quality metrics of the proposed scanning plan 106 based on one or more different sets of scan objectives as well. In various embodiments, user 110 is presented (e.g., via user interface 102) with indications of estimated scan performance metrics (including scan duration) and estimated scan quality metrics for the currently-selected scan objections and, in various instances, other alternative scan objectives as shown in FIGS. 10A and 10B. In various embodiments, user 110 is presented with a visual representation of the estimated scan performance metrics and scan quality metrics in a graph such as the radar graphs shown in FIGS. 10A and 10B.

At block 812, user 110 and/or SCPU 232 adjust the scan objectives based on the estimated scan performance metrics and/or scan quality metrics. For example, user 110 may determine that the estimated scan duration is too long or the scan coverage is too small to meet the user's needs and may change scan objectives accordingly. Alternatively, if user 110 has already set parameters such as a maximum scan duration, maximum number of iterations and/or minimum scan quality (e.g., minimum scan coverage, minimum detection confidence level), then SCPU 232 may adjust scan objectives to balance scan quality with scan performance.

Figure 11:
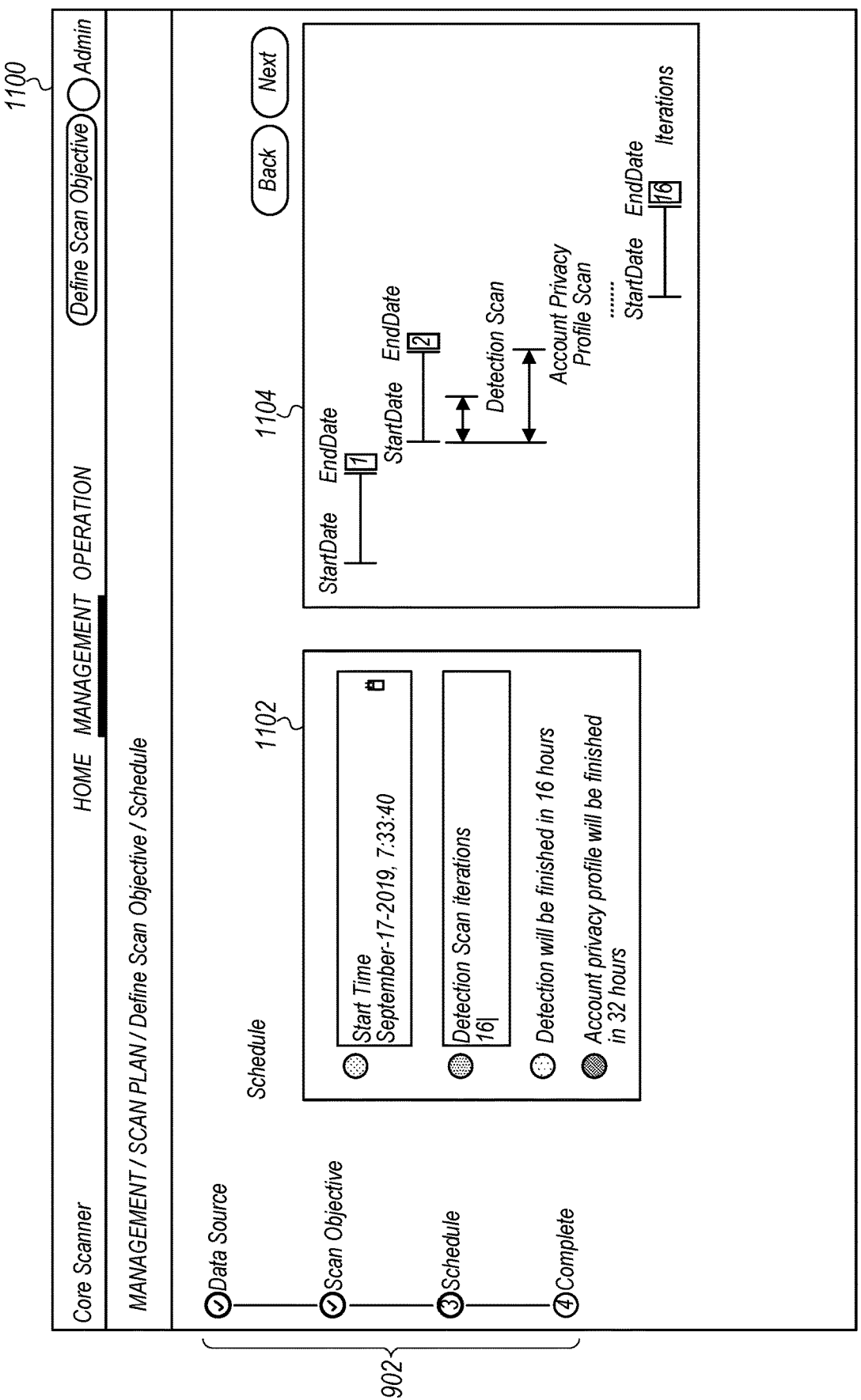
Figure 12:
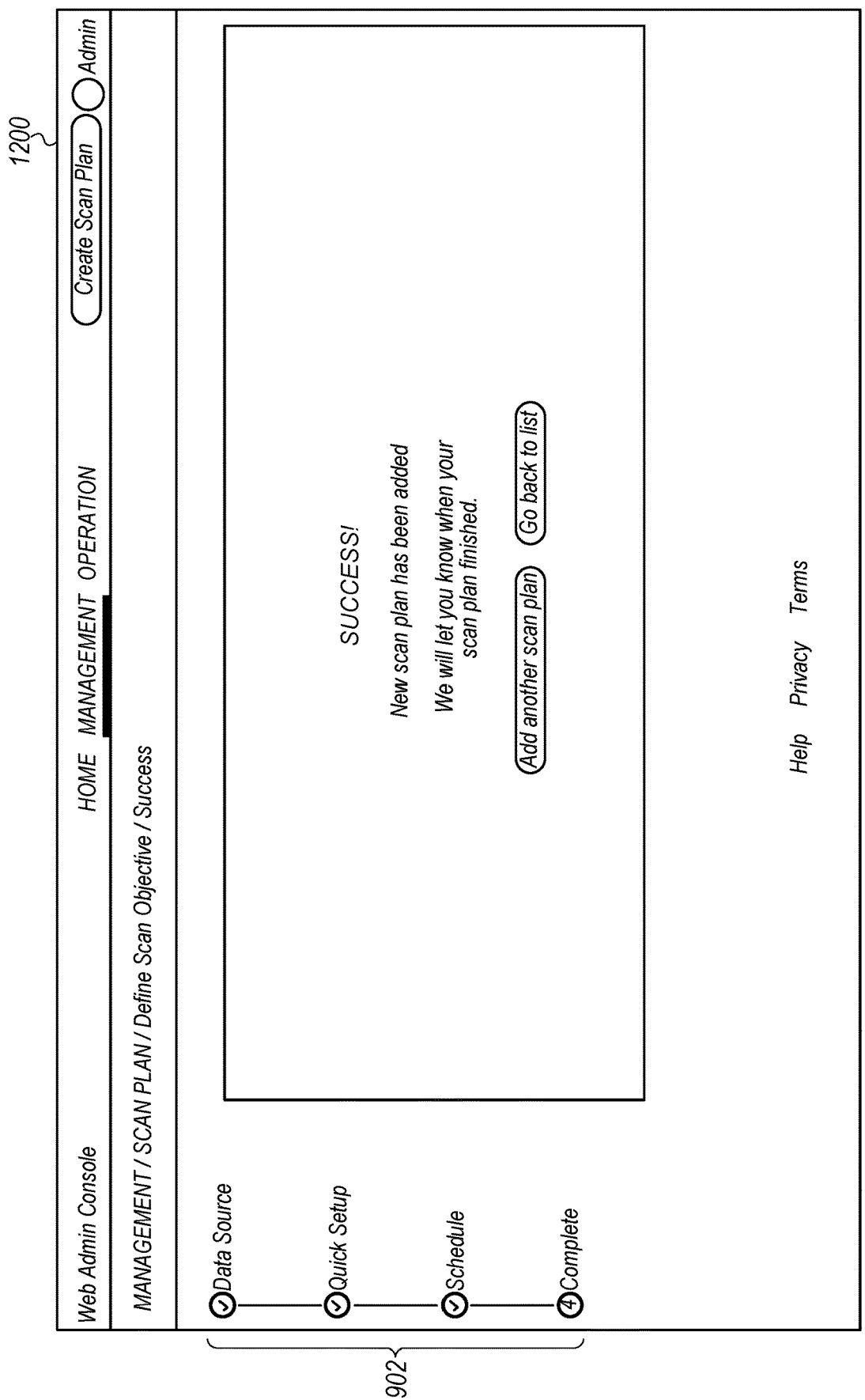

At block 814, the proposed scanning plan 106 (or the iteration of an existing scanning plan 106) is finalized, and the scan is initiated. In some instances, the scan is performed according to the original scan objectives determined at block 806, but in other instances the scan is performed according to the modified scan objectives determined at block 812. In various instances, the proposed scanning plan 106 (or the iteration of an existing scanning plan 106) is initiated in response to a command from user 110. In some embodiments, user 110 inputs a schedule for the start time and number of iterations for the scanning plan 106 as shown in FIG. 11. When the scan has been finalized, the user is presented with a success screen as shown in FIG. 12, and the scan is performed as requested. As discussed herein, the results of a scan are record and fed back into the scan planning process at block 804 to affect the planning and execution of subsequent scans.

FIGS. 9, 10A, 10B, 11, and 12 are screenshots of visual information presented on user interface 102 during an example process of preparing a scanning plan 106 in accordance with various embodiments. As discussed herein, user interface 102 is operable to present information (e.g., visual information, audible information) to user 110 and receive input from user 110 to facilitate the preparation of a scanning plan 106.

Referring now to FIG. 9, a selection screen 900 usable by user 110 to select one or more datastores 120 is shown according to various embodiments. Screen 900 includes a progress indicator 902 that represents progress through the process of preparing a scanning plan 106. On FIG. 9, progress indicator 902 shows that the process is at the first step, which corresponds to block 802 of FIG. 8. Screen 900 includes a selection region 910. Selection region 910 includes at least two sub-regions, data source selection region 912 and datastore selection region 914. In data source selection region 912, user 110 is provided with a list of data sources (e.g., physical memories or data storage clouds) on which datastores 120 are provisioned. After selecting various data sources, user 110 is provided with a list of datastores 120 corresponding to the selected date sources that may be scanned during the scanning plan 106 in datastore selection region 914. A user may select some or all of available datastores 120 and select "Next" to proceed to the next step.

Referring now to FIG. 10A, a scan objective selection screen 1000 is shown in accordance with various embodiments. Scan objective selection screen 1000 is useable by user 110 to input one or more scan objectives and to compare the estimated performance of various alternative scanning plans 106 having different sets of scan objectives. Progress indicator 902 now shows that the process is in the "Scan Objective" phase, which corresponds with blocks 806, 808, 810, and 812 of FIG. 8. Screen 1000 includes a scan objective set selection region 1002, an objective compare performance radar 1010, and an objective compare table 1020. In various embodiments, scan objective set selection region 1002 allows user 110 to add one or more sets of scan objectives to objective compare table 1020 and/or to add the sets of scan objectives to the scanning plan 106 by selecting the particular set of scan objectives. In various embodiments, user 110 is able to select from among customized sets 1004 and/or built-in sets 1006 of scan objectives. In various embodiments, built-in sets 1006 include a "fast touch" set that is useable to detect target information (e.g., privacy data, PII) without determining regionality, an "auto mode" set that is useable to scan for target information and determine regionality on samples from selected datastore 120, and a "full scale" set that is useable to scan all of the select datastores 120.

Objective compare performance radar 1010 includes a visual representation of estimated scan quality metrics and/or estimated scan performance metrics for various selected sets of scan objectives. In some embodiments, this visual representation is a radar graph. In the embodiment shown, the radar graph includes representations of F-1 score, detection coverage, sampling confidence, detection confidence, and duration with various sets of scan objects plotted on the radar graph. For example, plot 1012 represents the "auto mode" set of scan objectives and plot 1014 represents the "Small Business8" set of scan objectives. As can be seen quickly by inspecting the radar graph, comparing plot 1012 to plot 1014 indicates that the "auto mode" set of scan objectives results in a shorter duration than the "Small Business8" set of scan objectives Objective compare table 1020 includes a list of selected sets of scan objectives for comparison with additional details 1022. Additional details 1022 include the target sampling confidence levels, selected data categories for scanning (e.g., image, unstructured, structured, or a combination), scan priority, and iteration duration for the various sets of scan objectives. Additional details 1022 also indicate whether region detection is enabled or disabled, the generation of an account privacy profile is enabled for the sets of scan objectives. In various embodiments, account privacy profiles are pointers to various identified PII that can be used for fast location in a subsequent access (e.g., an access to delete a data record with PII). While each of the iteration durations is shown as "0 Hours" in the example shown in FIG. 10A, this is because this screen shot is merely an example. In various instances, the iteration duration for the fast touch set of scan objectives would be the shorter than the iteration duration for auto mode, and the iteration duration for "Small Business8" may be the longest. In various instances, the sampling confidence level and iteration duration are correlated such that when sampling confidence level increase the iteration duration also increase.

Referring now to FIG. 10B, scan objective customization screen 1040 is shown in accordance with various embodiments. Scan objective customization screen 1040 is useable by user 110 to fine-tune a custom set of scan objectives. Screen 1040 includes an objective compare performance radar 1010 that is operable to compare the previously-saved version of the set of scan objectives to an estimate reflecting the current revisions. Sampling confidence level selection region 1042 enables user 110 to select between commonly-used target sampling confidence levels (e.g., 50%, 99%. 100%) or enter a custom sampling target confidence level. Data category selection region 1044 enables user 110 to select whether to scan structured, unstructured, and/or image data in the selected datastores 120. Scan priority selection region 1046 enables user 110 to indicate the priority that computer system 100 would use to process this set of scan objectives (i.e., a higher priority scan is allocated resources over lower priority scans). Account privacy profile selection region 1048 enables user 110 to select whether the set of scan objectives will generate one or more account privacy profiles. Region detection selection region 1050 enables user 110 to enable or disable region detection. Region 1050 also enables user 110 to manually input regions that user 110 believes may be present in selected datastore 120 such that scanner 104 focuses on these regions. In some embodiments, user 110 is able to exclude particular regions from the scan (e.g., including the EU but excluding South Korea).

Sampling strategy selection region 1060 enables user 110 to select various sampling strategies to apply during scans performed according to the set of scan objectives. Such sampling strategies include but are not limited to: strategy 1062 (do not scan empty tables), strategy 1064 (full scan for tables for which the table size is smaller than the sampling size), strategies 1066 (apply the selected sampling method to small, midsize, large, or huge tables), strategy 10668 (refine new iterations based on source schema changes, source row count changes, etc.).

Referring now to FIG. 11, a scheduling screen 1100 is shown. Progress indicator 902 now shows that the process is in the "Schedule" phase, which corresponds with block 814 of FIG. 8. Region 1102 is useable by user 110 to enter in a start time and number of durations for the scanning plan. Region 1102 also includes an indication of the protected completion of detection, and (when enabled) the projected completion of the account privacy profile. Region 1104 includes a graphical representation of various portions of each iteration including data ingress, detection, and account privacy profile generation portions. Referring now to FIG. 12, scan planning process complete screen 1200 indicates that the scanning plan 106 has been completed and will proceed as scheduled.

Figure 13:
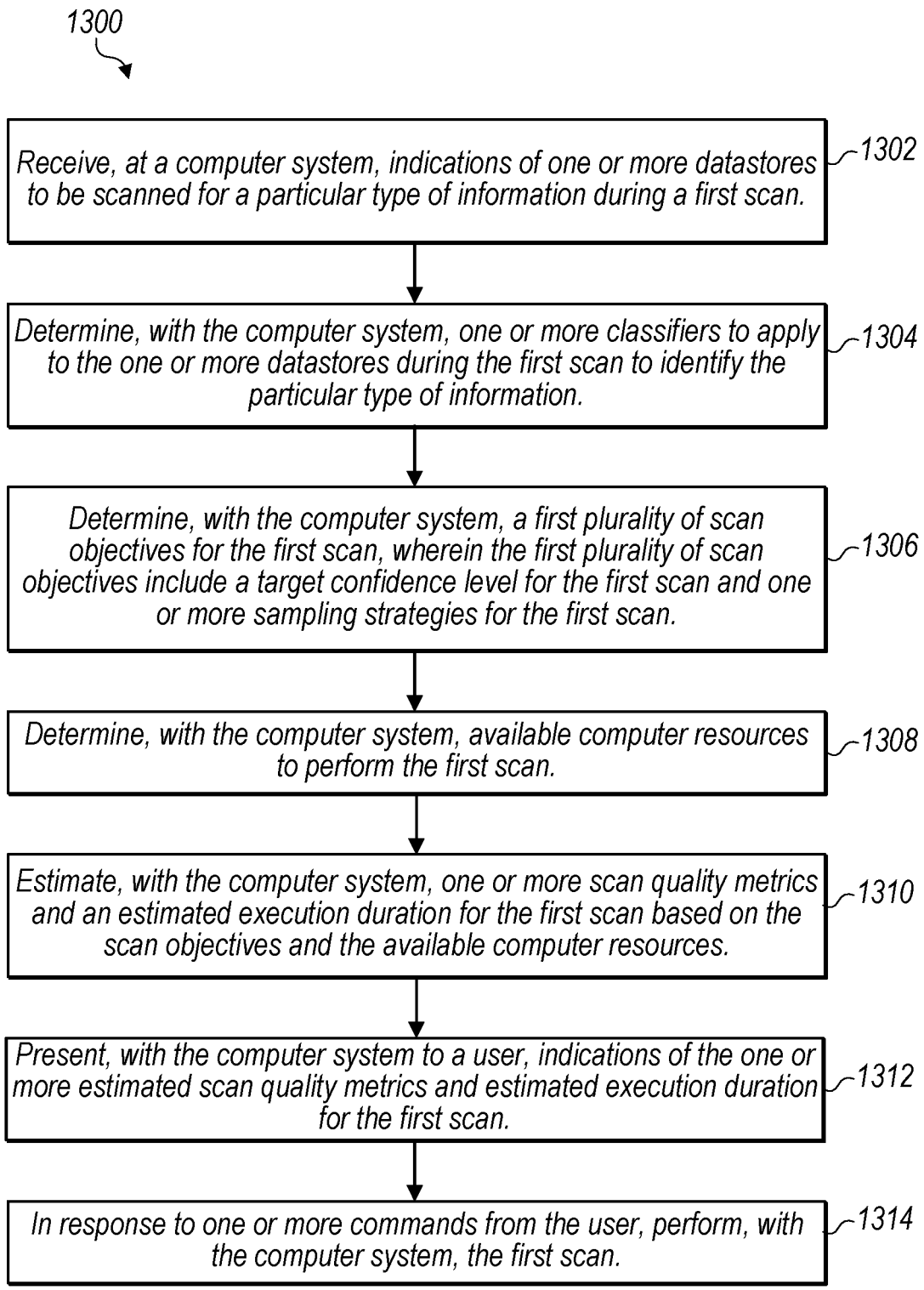
FIG. 13 is flowchart illustrating an embodiment of a scanning plan generation and implementation method in accordance with various embodiments.
Figure 14:
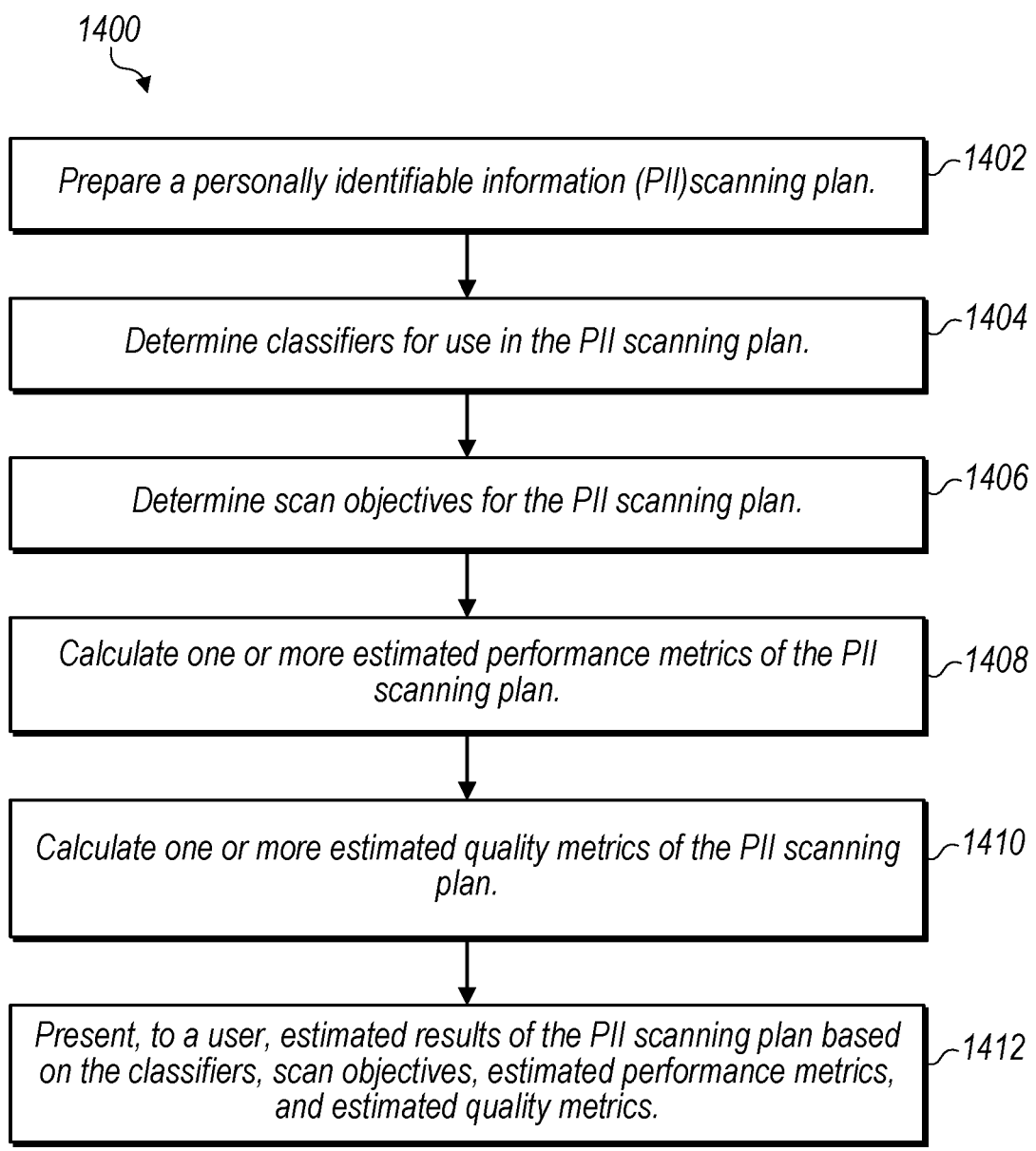
FIG. 14 is flowchart illustrating an embodiment of a scanning plan generation method in accordance with various embodiments.

FIGS. 13 and 14 illustrate various flowcharts representing various disclosed methods implemented with computer system 100. Referring now to FIG. 13, a flowchart depicting a scanning plan generation and implementation method 1300 is depicted. In the embodiment shown in FIG. 13, the various actions associated with method 1300 are implemented by computer system 100. At block 1302, computer system 100 receives indications of one or more datastores 120 to be scanned for a particular type of information during a first scan. At block 1304, computer system 100 determines one or more classifiers 206 to apply to the one or more datastores 120 during the first scan to identify the particular type of information (e.g., PII). At block 1306, computer system 100 determines a first plurality of scan objectives for the first scan, wherein the first plurality of scan objectives include a target sampling confidence level for the first scan and one or more sampling strategies for the first scan. At block 1308, computer system 100 determines available computer resources to perform the first scan. At block 1310, computer system 100 estimates one or more scan quality metrics and an estimated execution duration for the first scan based on the scan objectives and the available computer resources. At block 1312, computer system 100 presents to user 110, indications of the one or more estimated scan quality metrics and estimated execution duration for the first scan. At block 1314, in response to one or more commands from user 110, computer system 100 performs the first scan.

Referring now to FIG. 14, a flowchart depicting a scanning plan generation method 1400 is depicted. In the embodiment shown in FIG. 14, the various actions associated with method 1400 are implemented by computer system 100. At block 1402, computer system 100 prepares a personally identifiable information (PII) scanning plan 106. At block 1404, computer system 100 determines classifiers 206 for use in the PII scanning plan 106. At block 1406, computer system 100 determines scan objectives for the PII scanning plan 106. At block 1408, computer system 100 calculates one or more estimated performance metrics of the PII scanning plan 106. At block 1410, computer system 100 calculates one or more estimated quality metrics of the PII scanning plan 106. At block 1412, computer system 100 presents, to user 110, estimated results of the PII scanning plan 106 based on the classifiers, scan objectives, estimated performance metrics, and estimated quality metrics According to the disclosed techniques, as user 110 (who may be a data protection compliance manager for a plurality of datastores 120) desires to scan some of these datastores 120. A first datastore 120 includes unstructured logs of customer service interactions in which users may have disclosed PII. A second datastore 120 includes scans of driver's licenses. A third datastore 120 includes a names and address and a plurality of tables titled "cust." User 110 selects all three datastores 120 and commences to input scan objectives. User 110 observes that the fast touch scan is faster but user 110 determines that he would also like to have regional detection enabled. Accordingly, user 110 selects the auto mode scan, and choses to perform 10 iterations at an estimated 4 hours each. As the auto mode scan is performed, scanner 104 stores results. After a few iterations, scanner 104 has determined that the tables titled "cust" are customer record tables that are full of PII. Due to the high percentage of PII in these tables, scanner 104 adjusts the sampling strategy on subsequent scans to fully scan each of these tables. Additionally, scanner 104 determines that the first datastore 120 includes many volumes that do not include any PII. Based on the 99% target sampling confidence of the auto mode, scanner 104 determines that these volumes without PII can be skipped in subsequent scans. Accordingly, in various instances subsequent iterations have a shorter duration than prior iterations as scanner 104 learns more about the information in the three datastores 120. After the scan iterations have been completed, user 110 elects to perform the scans every month going forward to capture subsequently recorded PII. The user 110 also receives a report indicative of the results of the scan broken down by type of PII, region, and number of individuals.

Exemplary Computer System

Figure 15:
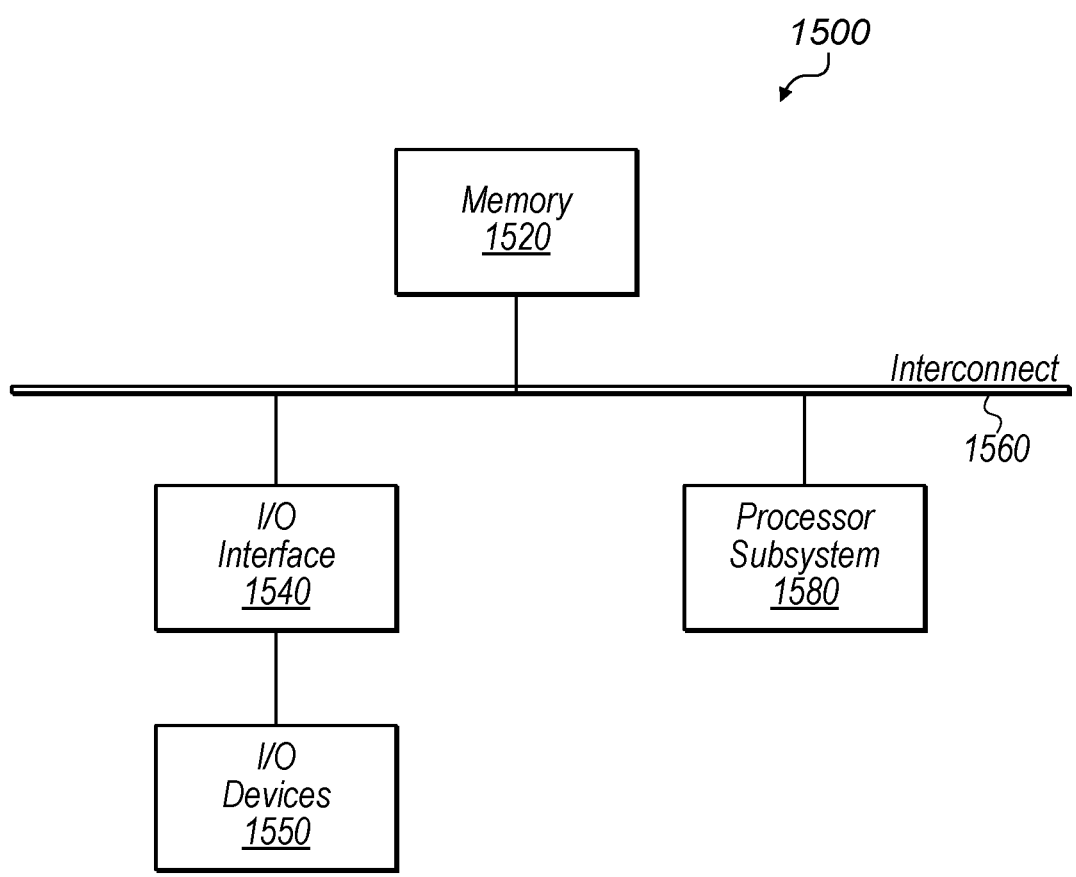
FIG. 15 is a block diagram of an exemplary computer system, which may implement the various components of FIGS. 1-14.

Turning now to FIG. 15, a block diagram of an exemplary computer system 1500, which may implement the various components of computer system 100 (e.g., user interface 102, scanner 104, datastore 120) is depicted. Computer system 1500 includes a processor subsystem 1580 that is coupled to a system memory 1520 and I/O interfaces(s) 1540 via an interconnect 1560 (e.g., a system bus). I/O interface(s) 1540 is coupled to one or more I/O devices 1550. Computer system 1500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1500 is shown in FIG. 15 for convenience, computer system 1500 may also be implemented as two or more computer systems operating together.

Processor subsystem 1580 may include one or more processors or processing units. In various embodiments of computer system 1500, multiple instances of processor subsystem 1580 may be coupled to interconnect 1560. In various embodiments, processor subsystem 1580 (or each processor unit within processor subsystem 1580) may contain a cache or other form of on-board memory.

System memory 1520 is usable to store program instructions executable by processor subsystem 1580 to cause computer system 1500 perform various operations described herein. System memory 1520 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1500 is not limited to primary storage such as system memory 1520. Rather, computer system 1500 may also include other forms of storage such as cache memory in processor subsystem 1580 and secondary storage on I/O Devices 1550 (e.g., a hard drive, storage array, etc.). In some embodiments, these other forms of storage may also store program instructions executable by processor subsystem 1580.

I/O interfaces 1540 may be any of various types of interfaces configured to couple to and communicate with other devices, according to various embodiments. In one embodiment, I/O interface 1540 is a bridge chip (e.g., Southbridge) from a front-side to one or more back-side buses. I/O interfaces 1540 may be coupled to one or more I/O devices 1550 via one or more corresponding buses or other interfaces. Examples of I/O devices 1550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1500 is coupled to a network via a I/O device 1550 that provides a network interface (e.g., a device configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   receiving, at a computer system, indications of one or more datastores to be scanned for a particular type of information during a first scan;
   selecting, with the computer system, a proper subset of a plurality of classifiers to apply to the one or more datastores during the first scan to identify the particular type of information, wherein the proper subset is selected from the plurality of classifiers based on the particular type of information and on metadata corresponding to one or more datastores;
   determining, with the computer system based on the proper subset of classifiers, a first plurality of scan objectives for the first scan, wherein the first plurality of scan objectives include a target sampling confidence level for the first scan and one or more sampling strategies for the first scan, wherein the target sampling confidence level is indicative of an amount of sampling to represent a larger dataset;
   determining, with the computer system, available computer resources to perform the first scan;
   estimating, with the computer system, one or more scan quality metrics and an estimated execution duration for the first scan based on the scan objectives and the available computer resources;
   presenting, with the computer system to a user, indications of the one or more estimated scan quality metrics and estimated execution duration for the first scan; and
   in response to one or more commands from the user, performing, with the computer system, the first scan.

2. The method of claim 1, further comprising:
   wherein the one or more commands from the user includes commands to modify the first plurality of scan objectives; and
   wherein performing the first scan includes performing the first scan according to the modified first plurality of scan objectives.

3. The method of claim 1, wherein performing the first scan includes storing results of the first scan; the method further comprising:
   determining, with the computer system and using the stored results of the first scan, a second plurality of scan objectives for a second scan; and
   performing, with the computer system, the second scan according to the second plurality of scan objectives.

4. The method of claim 3, wherein the second plurality of scan objectives includes a second target confidence level that is greater than the target sampling confidence level of the first plurality of scan objectives.

5. The method of claim 3, wherein the second plurality of scan objectives includes omitting one or more of the one or more datastores from at least a portion of the second scan.

6. The method of claim 3, further comprising:
   determining, with the computer system, one or more second classifiers to apply to the one or more datastores during the second scan to identify the particular type of information, wherein the one or more second classifiers are based on the stored results of the first scan; and
   wherein performing the second scan includes using the one or more second classifiers.

7. The method of claim 3,
   wherein the stored results of the first scan are indicative of information covered by a particular personally identifiable information (PII) governance regulation;
   wherein the second plurality of scan objectives includes an indication of the particular PII governance regulation; and
   wherein performing the second scan includes searching for information covered by the particular PII governance regulation.

8. The method of claim 3,
   wherein the stored results of the first scan are does not include any information covered by a particular personally identifiable information (PII) governance regulation; and
   wherein the second plurality of scan objectives excludes the particular PII governance regulation; and
   wherein performing the second scan includes not searching for information covered by the particular PII governance regulation.

9. A non-transitory, computer-readable medium storing instructions that when executed by a computer system cause the computer system to perform operations comprising:
   receiving, at a computer system, indications of one or more datastores to be scanned for personally identifiable information (PII) during a PII scan;
   prior to performing the PII scan:
      selecting, with the computer system, a proper subset of a plurality of classifiers to apply to the one or more datastores during the PII scan to identify PII;
      determining, with the computer system based on the proper subset of classifiers, a first plurality of scan objectives for the PII scan, wherein the first plurality of scan objectives include indications of portions of a PII scan logic library to be used in the PII scan;
      determining, with the computer system, available computer resources to perform the PII scan;
      estimating, with the computer system, one or more scan quality metrics and an estimated execution duration for the PII scan based on the scan objectives and the available computer resources; and
      presenting, with the computer system to a user, indications of the one or more estimated scan quality metrics and estimated execution duration for the PII scan; and
   in response to one or more commands from the user, performing, with the computer system, the PII scan.

10. The computer-readable medium of claim 9, wherein the indications of one or more datastores includes locations of the one or more datastores and metadata about the one or more datastores, and wherein the proper subset of the plurality of classifiers is selected using the metadata.

11. The computer-readable medium of claim 9,
    wherein performing the PII scan includes storing results of the PII scan; and
    wherein the results of the PII scan includes information about data stored in the one or more datastores and information about a performance of the PII scan, wherein the information about data stored in the one or more datastores includes indications of one or more data classes detected in the PII scan and indications of data corresponding to a particular PII governance regulation.

12. The computer-readable medium of claim 9,
    wherein the PII scan includes:
       detecting PII in the one or more datastores using the proper subset of classifiers;
       identifying particular individuals corresponding to the detected PII; and
       storing one or more metrics indicative of the PII scan.

13. The computer-readable medium of claim 9, the operations further comprising:
    receiving, at the computer system, and indication of a particular individual identified in the PII scan; and
    in response to the indication of the particular individual, identifying all of PII corresponding to the particular individual that was identified in the PII scan.

14. The computer-readable medium of claim 13, the operations further comprising:
    in response to receiving a deletion request, deleting from the one or more datastores all of the PII corresponding to the particular individual.

15. The computer-readable medium of claim 9, the operations further comprising:
    determining, with the computer system, a second plurality of scan objectives for an alternative PII scan, wherein the second plurality of scan objectives is different from the first plurality of scan objectives;
    determining, with the computer system, available computer resources to perform the alternative PII scan;
    estimating, with the computer system, one or more alternative estimated scan quality metrics and an alternative estimated execution duration for the alternative PII scan based on the second plurality of scan objectives and the available computer resources; and
    presenting, with the computer system, a user interface including indications of the one or more estimated scan quality metrics and estimated execution duration for the PII scan and the one or more alternative estimated scan quality metrics and the alternative estimated execution duration for the alternative PII scan;
    wherein performing the PII scan is done in response to receiving a user selection of the PII scan via the user interface.

16. The computer-readable medium of claim 9,
    wherein the indications of portions of a PII scan logic library to be used in the PII scan includes an indication of one or more PII governance regulations corresponding to the PII scan, and wherein determining the first plurality of scan objectives includes receiving, at the computer system from the user, one or more user selections corresponding to the one or more PII governance regulations.

17. A computer system comprising:

one or more computer processors; and a computer memory storing instructions that when executed by the one or more computer processors causes the computer system to implement a personally identifiable information (PII) scanning platform, wherein the PII scanning platform is operable, prior to performing a PII scan, to:

prepare a PII scanning plan to scan one or more datastores storing information;

determine, based on types of information in the one or more datastores, a proper subset of a plurality of classifiers for use in the PII scanning plan;

determine scan objectives for the PII scanning plan, wherein the scan objectives include a number of scan iterations to perform;

calculate one or more estimated scan performance metrics of the PII scanning plan;

calculate one or more estimated scan quality metrics of the PII scanning plan; and present, to a user, estimated results of the PII scanning plan based on the classifiers, scan objectives, estimated scan performance metrics, and estimated scan quality metrics.

18. The computer system of claim 17, wherein the one or more datastores are restricted datastores, wherein the restricted datastores are configured to permit only local access to the stored information;

wherein the PII scanning platform is operable (a) to prepare the PII scanning plan to scan the one or more restricted datastores and (b) to execute the PII scanning plan on the one or more restricted datastores.

19. The computer system of claim 17, wherein the PII scanning platform is operable to accept one or more classifiers input by a user, to receive information corresponding prior PII scans, and to determine the classifiers for use in the PII scanning plan using the classifiers input by the user and information corresponding to prior PII scans.

20. The computer system of claim 17, wherein the estimated scan quality metrics are calculated using at least some of the estimated scan performance metrics, and wherein the estimated scan quality metrics include indications of scan coverage, sampling confidence, detection confidence, and accuracy.

* * * * *